US010008887B2

(12) United States Patent
Zeine

(10) Patent No.: US 10,008,887 B2
(45) Date of Patent: Jun. 26, 2018

(54) WIRELESS POWER TRANSMISSION SYSTEM

(71) Applicant: Ossia, Inc., Bellevue, WA (US)

(72) Inventor: Hatem Zeine, Bellevue, WA (US)

(73) Assignee: OSSIA, INC., Bellevue, WA (US)

( * ) Notice: Subject to any disclaimer, the term of this patent is extended or adjusted under 35 U.S.C. 154(b) by 0 days. days.

(21) Appl. No.: 14/859,909

(22) Filed: Sep. 21, 2015

(65) Prior Publication Data

US 2016/0013685 A1     Jan. 14, 2016

Related U.S. Application Data

(63) Continuation of application No. 14/507,095, filed on Oct. 6, 2014, now Pat. No. 9,142,973, which is a
(Continued)

(51) Int. Cl.
| | |
|---|---|
| *B60R 25/04* | (2013.01) |
| *H04M 1/00* | (2006.01) |
| *H02J 50/27* | (2016.01) |
| *H02J 50/70* | (2016.01) |
| *H02J 50/80* | (2016.01) |
| *H02J 50/90* | (2016.01) |
| *H02J 50/40* | (2016.01) |
| *H02J 7/02* | (2016.01) |

(Continued)

(52) U.S. Cl.
CPC ............. *H02J 50/27* (2016.02); *H02J 5/005* (2013.01); *H02J 7/0021* (2013.01); *H02J 7/025* (2013.01); *H02J 17/00* (2013.01); *H02J 50/20* (2016.02); *H02J 50/23* (2016.02); *H02J 50/40* (2016.02); *H02J 50/70* (2016.02); *H02J 50/80* (2016.02); *H02J 50/90* (2016.02); *H02J 7/007* (2013.01)

(58) Field of Classification Search
CPC combination set(s) only.
See application file for complete search history.

(56) References Cited

U.S. PATENT DOCUMENTS

| | | |
|---|---|---|
| 3,989,994 A | 11/1976 | Brown |
| 4,257,050 A | 3/1981 | Ploussios |

(Continued)

FOREIGN PATENT DOCUMENTS

| | | |
|---|---|---|
| EP | 1922824 | 5/2008 |
| EP | 1992077 | 11/2008 |

(Continued)

OTHER PUBLICATIONS

Erictric, "Wireless Charging? Nokia's Newest Prototype Phone Has It," (Jun. 17, 2009) available at http://erictric.com/2009/06/17/wireless-charging-nokias-newest-prototype-phone-has-it/.
(Continued)

*Primary Examiner* — Brian Zimmerman
*Assistant Examiner* — Cal Eustaquio
(74) *Attorney, Agent, or Firm* — Volpe and Koenig, P.C.

(57) ABSTRACT

The wireless power transmission is a system for providing wireless charging and/or primary power to electronic/electrical devices via microwave energy. The microwave energy is focused to a location by a power transmitter having one or more adaptively-phased microwave array emitters. Rectennas within the device to be charged receive and rectify the microwave energy and use it for battery charging and/or for primary power.

18 Claims, 14 Drawing Sheets

Related U.S. Application Data continuation of application No. 14/052,828, filed on Oct. 14, 2013, now Pat. No. 8,854,176, which is a continuation of application No. 13/851,528, filed on Mar. 27, 2013, now Pat. No. 8,558,661, which is a continuation of application No. 13/443,355, filed on Apr. 10, 2012, now Pat. No. 8,410,953, which is a continuation of application No. 12/861,526, filed on Aug. 23, 2010, now Pat. No. 8,159,364, which is a continuation-in-part of application No. 11/812,060, filed on Jun. 14, 2007, now Pat. No. 8,446,248.

(51) Int. Cl.
    H02J 17/00    (2006.01)
    H02J 5/00     (2016.01)
    H02J 50/20    (2016.01)
    H02J 50/23    (2016.01)
    H02J 7/00     (2006.01)

(56) References Cited

U.S. PATENT DOCUMENTS

| | | |
|---|---|---|
| 4,361,892 A | 11/1982 | Martin |
| 4,685,047 A | 8/1987 | Phillips, Sr. |
| 4,779,097 A | 10/1988 | Morchin |
| 5,218,374 A | 6/1993 | Koert et al. |
| 5,223,781 A | 6/1993 | Criswell et al. |
| 5,400,037 A | 3/1995 | East |
| 5,486,833 A | 1/1996 | Barrett |
| 5,503,350 A * | 4/1996 | Foote ............... B64C 39/024 244/1 R |
| 5,733,313 A | 3/1998 | Barreras, Sr. et al. |
| 6,114,834 A | 9/2000 | Parise |
| 6,127,799 A | 10/2000 | Krishnan |
| 6,474,341 B1 | 11/2002 | Hunter et al. |
| 6,615,074 B2 | 9/2003 | Mickle et al. |
| 6,621,470 B1 | 9/2003 | Boeringer et al. |
| 6,690,324 B2 | 2/2004 | Vail et al. |
| 6,721,159 B2 | 4/2004 | Takashige et al. |
| 6,738,017 B2 | 5/2004 | Jacomb-Hood |
| 6,856,291 B2 | 2/2005 | Mickle et al. |
| 6,882,128 B1 | 4/2005 | Rahmel et al. |
| 6,967,462 B1 | 11/2005 | Landis |
| 7,068,991 B2 | 6/2006 | Parise |
| 7,084,605 B2 | 8/2006 | Mickle et al. |
| 7,288,918 B2 | 10/2007 | DiStefano |
| 7,307,589 B1 * | 12/2007 | Gregoire ............... H01Q 1/248 343/700 MS |
| 7,744,032 B2 | 6/2010 | Quinn et al. |
| 8,310,201 B1 | 11/2012 | Wright |
| 2002/0057219 A1 | 5/2002 | Obayashi |
| 2004/0140929 A1 | 7/2004 | Toda et al. |
| 2004/0142733 A1* | 7/2004 | Parise ............... B01F 5/0614 455/572 |
| 2006/0270440 A1* | 11/2006 | Shearer ............... H02J 17/00 455/522 |
| 2007/0037528 A1 | 2/2007 | Doan et al. |
| 2007/0132578 A1* | 6/2007 | Powell ............... G08B 21/023 340/539.26 |
| 2007/0247883 A1 | 10/2007 | Belyanin |
| 2008/0014897 A1 | 1/2008 | Cook et al. |
| 2008/0042847 A1 | 2/2008 | Hollister et al. |
| 2008/0054638 A1 | 3/2008 | Greene et al. |
| 2008/0227478 A1 | 9/2008 | Greene et al. |
| 2009/0284220 A1 | 11/2009 | Toncich et al. |
| 2010/0033021 A1 | 2/2010 | Bennett |
| 2010/0133920 A1 | 6/2010 | Joannopoulos et al. |

FOREIGN PATENT DOCUMENTS

| | | |
|---|---|---|
| EP | 2269408 | 1/2011 |
| JP | 07-236204 | 9/1995 |
| JP | 08-037743 | 2/1996 |
| JP | 08-103039 | 4/1996 |
| JP | 08-130840 | 5/1996 |
| JP | 2002-084685 A2 | 3/2002 |
| JP | 2002-152995 | 5/2002 |
| JP | 2004-229427 | 8/2004 |
| JP | 2005-261187 | 9/2005 |
| JP | 2006246633 | 9/2006 |
| JP | 2007-022382 | 2/2007 |
| KR | 2005-0096068 | 10/2005 |
| KR | 10-0654623 | 12/2006 |
| KR | 2007-0055086 | 5/2007 |
| SU | 1094110 A1 | 5/1984 |
| WO | 01/03438 | 1/2001 |
| WO | 2007021891 A1 | 2/2007 |
| WO | 2007084717 A2 | 7/2007 |
| WO | 2009111597 A2 | 9/2009 |

OTHER PUBLICATIONS

Smart Antennas for Wireless Mobile Communication, http://www.antennasonline.com/ast_newsletter2_10-04.htm.

* cited by examiner

WIRELESS POWER TRANSMISSION SYSTEM

CROSS REFERENCE TO RELATED APPLICATIONS

This application is a continuation of U.S. patent application Ser. No. 14/507,095, filed on Oct. 6, 2014, which is a continuation of U.S. patent application Ser. No. 14/052,828, filed on Oct. 14, 2013, which issued as U.S. Pat. No. 8,854,176 on Oct. 7, 2014, which is a continuation of U.S. patent application Ser. No. 13/851,528, filed on Mar. 27, 2013, which issued as U.S. Pat. No. 8,558,661 on Oct. 15, 2013, which is a continuation of U.S. patent application Ser. No. 13/443,355, filed Apr. 10, 2012, which issued as U.S. Pat. No. 8,410,953 on Apr. 2, 2013, which is a continuation of U.S. patent application Ser. No. 12/861,526, filed Aug. 23, 2010, which issued as U.S. Pat. No. 8,159,364 on Apr. 17, 2012, which is a continuation-in-part of U.S. patent application Ser. No. 11/812,060, filed Jun. 14, 2007, which issued as U.S. Pat. No. 8,446,248 on May 21, 2013, all of which are incorporated herein by reference as if fully set forth.

FIELD OF INVENTION

The present invention relates generally to power transmission systems and battery chargers, and particularly to a method and system for wireless power transmission by microwave transmission to power a device requiring electrical power.

BACKGROUND

Many portable electronic devices are powered by batteries. Rechargeable batteries are often used to avoid the cost of replacing conventional dry-cell batteries, and to conserve precious resources. However, recharging batteries with conventional rechargeable battery chargers requires access to an alternating current (A.C.) power outlet, which is sometimes not available or not convenient. It would therefore be desirable to derive power for a battery charger from electromagnetic radiation.

While solar-powered battery chargers are known, solar cells are expensive, and a large array of solar cells may be required to charge a battery of any significant capacity. Another potential source of electromagnetic energy that would provide power to a battery charger at a location remote from the A.C. power mains is microwave energy, which might be derived from a solar powered satellite and transmitted to earth by microwave beams, or derived from ambient radio frequency energy from cell phone transmitters and the like. However, there are several problems associated with the efficient delivery of power by microwave transmission that have precluded the use of dedicated terrestrial microwave power transmitters for the purpose.

Assuming a single source power transmission of electromagnetic (EM) signal, an EM signal gets reduced by a factor of $1/r^2$ in magnitude over a distance r. Thus, the received power at a large distance from the EM transmitter is a small fraction of the power transmitted.

To increase the power of the received signal, we would have to boost the transmission power. Assuming that the transmitted signal has an efficient reception at three centimeters from the EM transmitter, receiving the same signal power over a useful distance of three meters would entail boosting the transmitted power by 10,000×. Such power transmission is wasteful, as most of the energy would be transmitted and not received by the intended devices, it could be hazardous to living tissue, it would most likely interfere with most electronic devices in the immediate vicinity, and it may be dissipated as heat.

Utilizing a directional antenna has several challenges, some of which are: knowing where to point it; the mechanical devices needed to track it would be noisy and unreliable; and creating interference for devices in the line of sight of the transmission.

Directional power transmission generally requires knowing the location of the device to be able to point the signal in the right direction to enhance the power transmission efficiency. However, even when the device is located, efficient transmission is not guaranteed due to reflections and interference of objects in the path or vicinity of the receiving device.

Thus, a wireless power transmission system solving the aforementioned problems is desired.

SUMMARY

The wireless power transmission is a system for providing wireless charging and/or primary power to electronic/electrical devices via microwave energy. The microwave energy is focused to a location in response to receiving a beacon signal from a beacon device by a power transmitter having one or more adaptively-phased microwave array emitters. Rectennas within the device to be charged receive and rectify the microwave energy and use it for battery charging and/or for primary power.

The device to be charged reports the received beam signal strength at the rectennas to the power source via the side channel. This information is used by the system to adjust the transmitting phases of the microwave array emitters until maximum microwave energy is reported by the device to be charged.

Alternatively, the array elements can be set to receive a calibration signal from the device being charged. Each array element can detect/report phase information from the received calibration signal. Subsequently, each array element uses the detected phase for that element as a guide to the transmitting phase back to the device being charged.

Mirror focal points caused by, for example, flat, two dimensional arrays are minimized by physically configuring the microwave array emitters in a substantially non-uniform, non-coplanar manner.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION

Figure 1A:
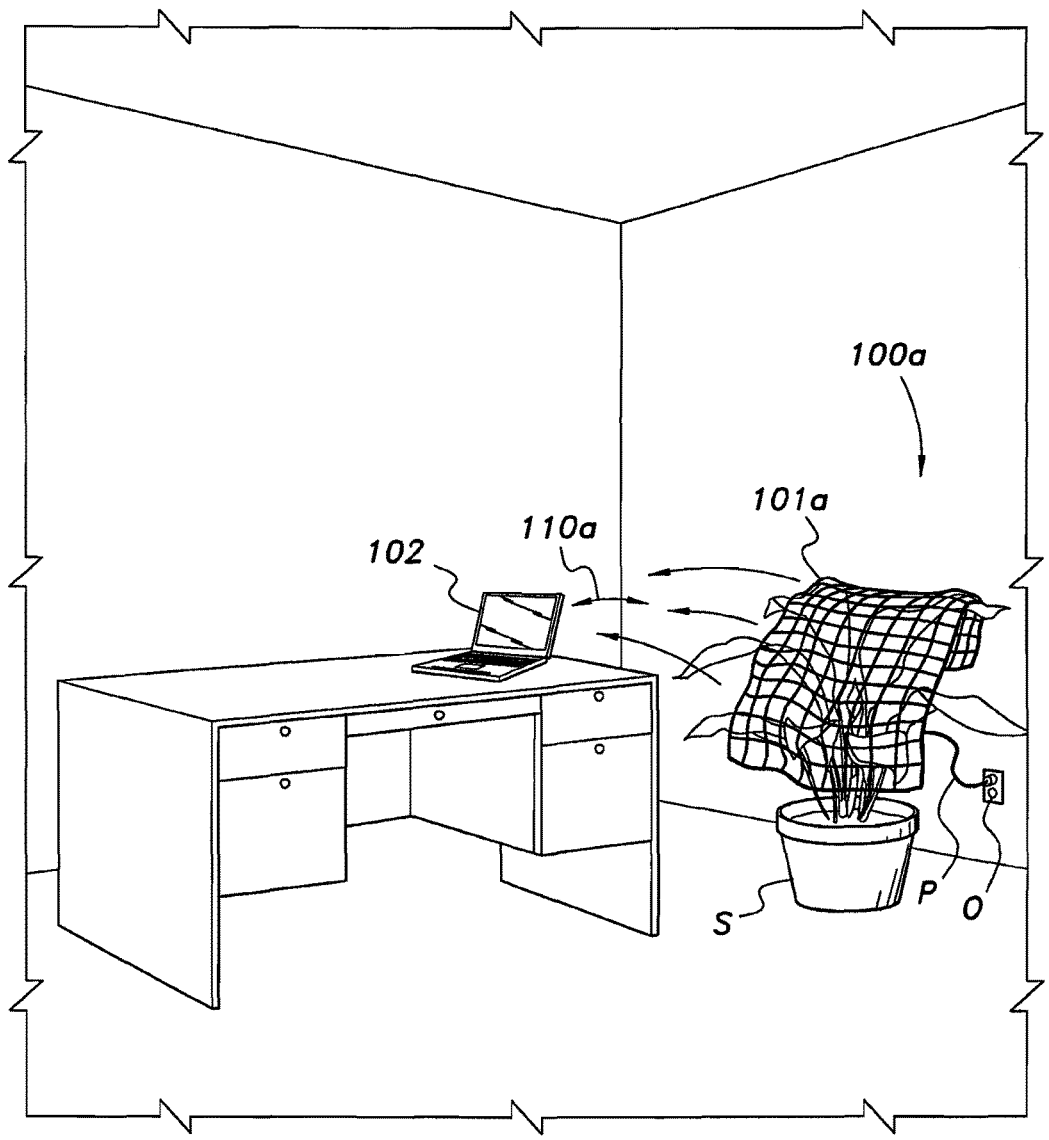
FIG. 1A is an environmental, perspective view of a first embodiment of a wireless power transmission system according to the present invention.
Figure 1B:
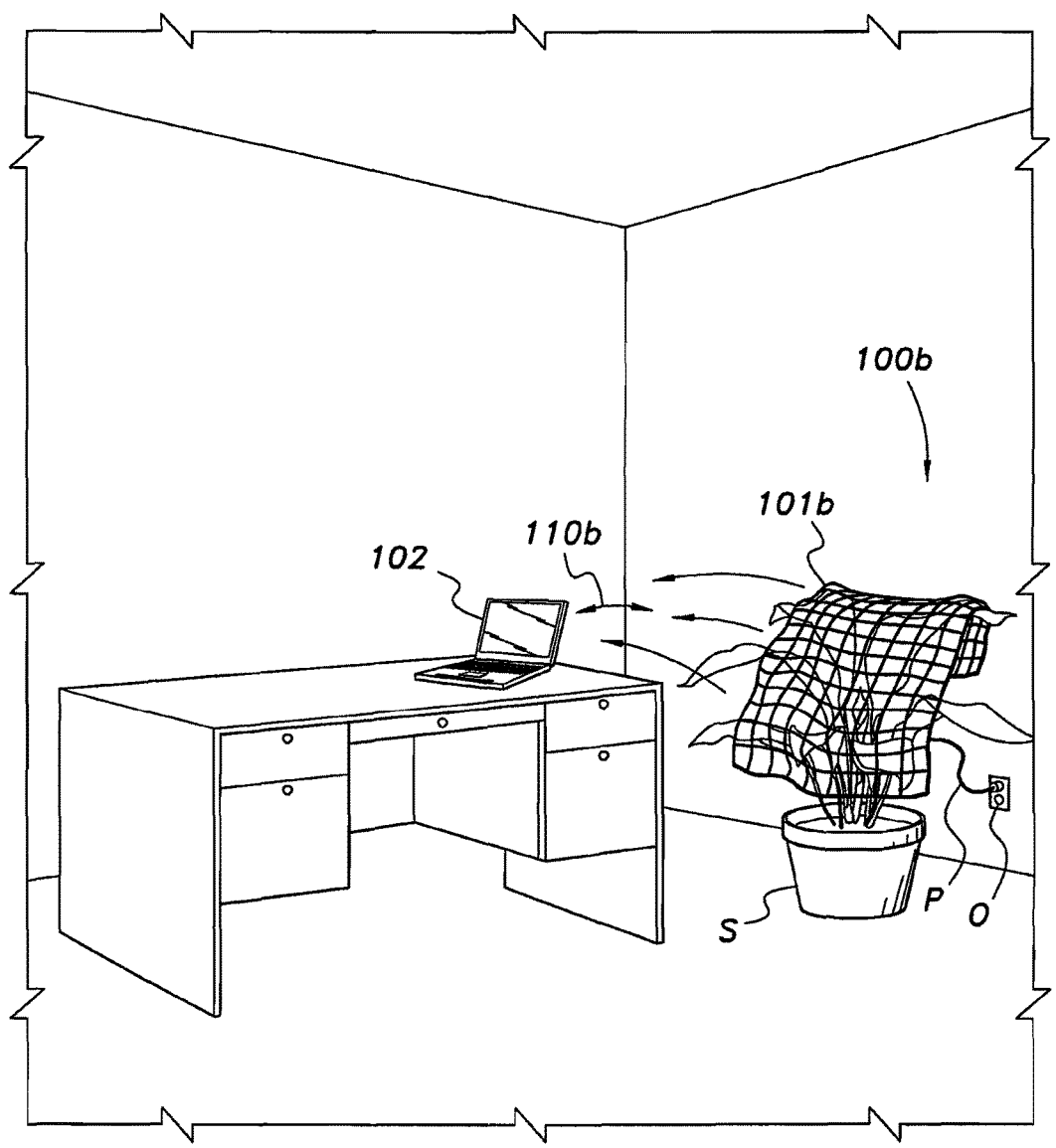
FIG. 1B is an environmental, perspective view of a second embodiment of a wireless power transmission system according to the present invention.

As shown in FIGS. 1A-1B, the present invention includes a system 100a, or alternative system 100b, for providing wireless charging and/or primary power to electronic/electrical devices, such as laptop computer 102, or the like, via microwave energy. In either system 100a or system 100b, power transmission grid 101a or alternative power transmission grid 101b can obtain operational power from the A.C. mains via power cord P being plugged into power outlet O. The microwave transmission frequency is preferably an available FCC unregulated frequency having a suitable wavelength. Since the wavelength can limit resolving power of the phased array 101a or alternative phased array 101b, a preferred frequency, although not limiting the choice of other frequencies that the system may operate on, has been determined to be 5.8 GHz (5.17 cm wavelength), which is suitable for power transmission to such devices as a laptop, cell phone, PDA, etc., over distances on the scale of a room, auditorium, or the like.

As shown in FIGS. 1A-3B, the microwave energy is focused onto a device to be charged by a power source 300 connected to one or more adaptively-phased microwave array emitters 204, i.e., antennae or radiators. According to the present invention, the microwave energy from the adaptively-phased microwave array emitters 204 may be focused onto the device without the need to know the location of the device. As shown in FIGS. 1A, 1B, and 3A-3B, preferably highly efficient rectennas 340 (a rectenna is a rectifying antenna that converts microwave energy directly into direct current (D.C.) electricity; such devices are known in the art and will not be described further herein) within the device to be charged 102 receive and rectify the microwave energy and use it for charging battery 370 via charging and/or for primary power to the device 102 as determined by control logic 350. In a first embodiment, a communications channel is opened between the wireless power source 100a and power receiver 330b in the device to be charged 102 on a frequency other than the frequency used to convey power.

The device to be charged 102 relays a received beam signal strength at the rectennas 340 over the communications channel 110a to a receiver section of communications device 320 in the power transmitter 330a of system 100a via a signal from a transmitter section of communications device 360 in the power receiver 330b. This information is used by control logic 310 of the system 100a to power up, power down, and adjust the transmitting phases of the microwave array emitter nodes 204 until a maximum microwave energy beam 301 is radiated by the array 110a, as reported by the device to be charged 102.

Each emitter 204, being connected to a single source of the desired transmission frequency, can transmit a signal with a specific phase difference, which is a multiple of $\pi/2$. The $\pi/2$ phase increments are exemplary only, and other phase increments such as $\pi/4$, $\pi/8$, $\pi/16$, and the like, are possible. Preferably, power is not adjusted, except that the emitter 204 can be turned off or turned on to a desired phase.

Figure 2A:
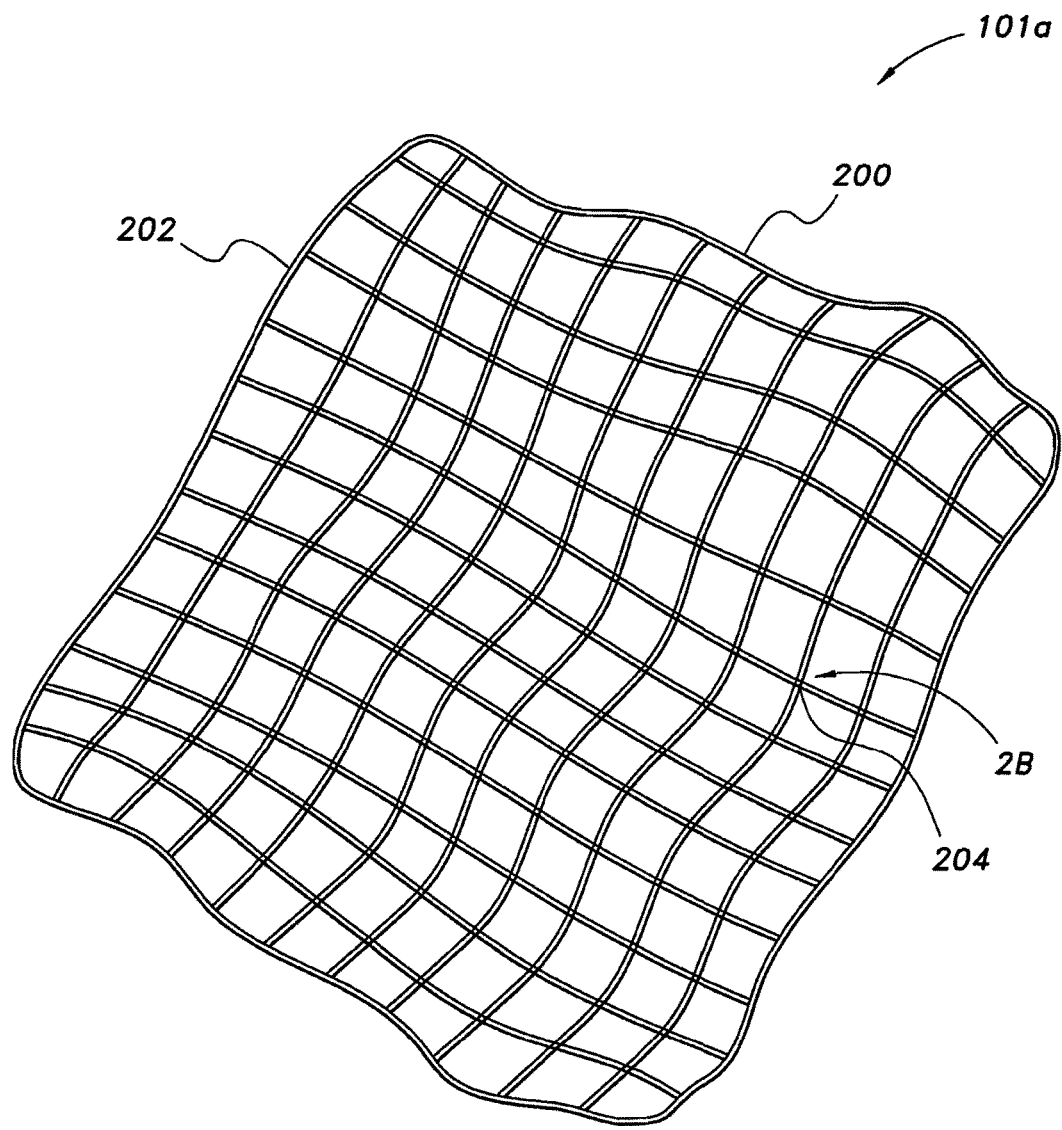
FIG. 2A is a perspective view of the phased array net antenna for a microwave transmitter in a wireless power transmission system according to the present invention.
Figure 2B:
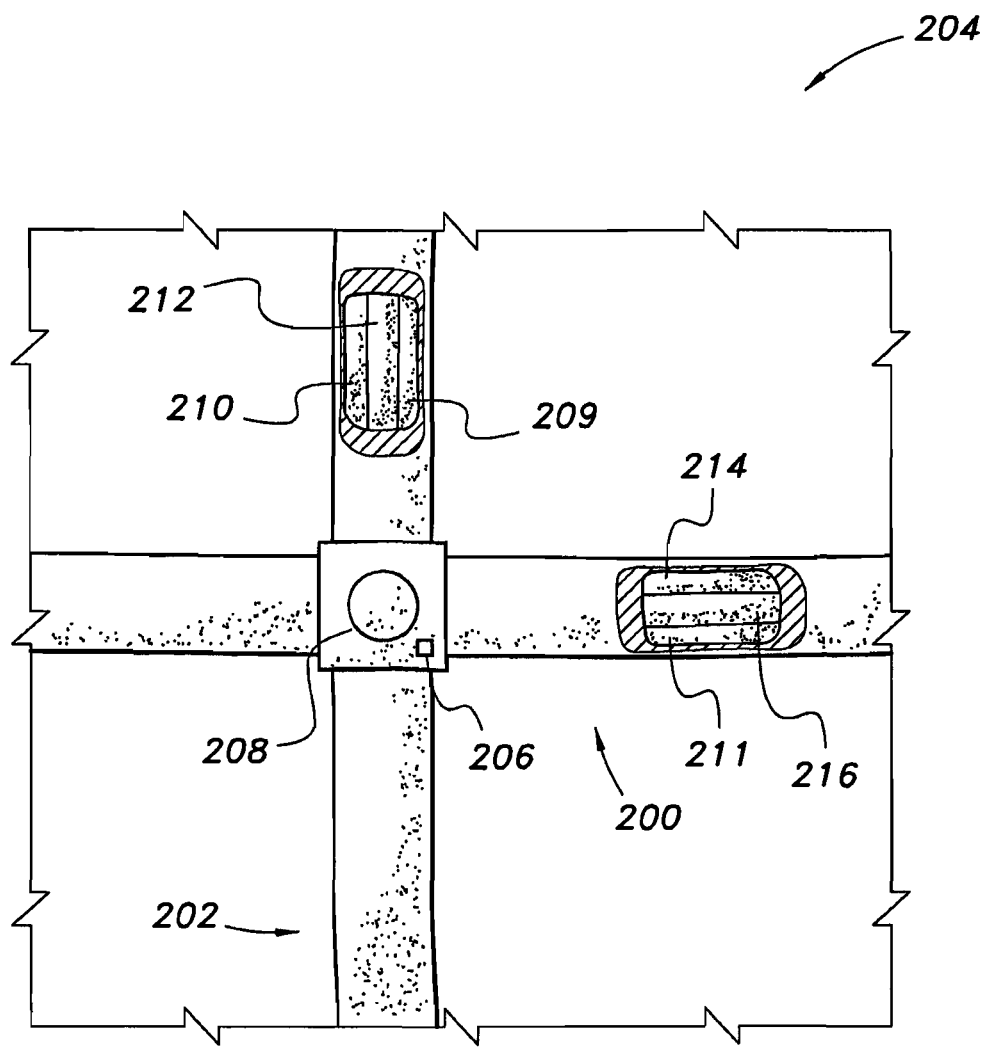
FIG. 2B is a diagrammatic view of a power transmission node in a wireless power transmission system according to the present invention.

As most clearly shown in FIGS. 2A-2B, vertical and horizontal cables intersect at each array node 204. This configuration applies to either array 101a or array 101b. Within vertical cable 202, wire 210 is a zero phase feed line. Wire 212 is a $\frac{1}{2}\pi$ phase feed line, and wire 209 is a vertical control line. Similarly, within horizontal cable 200, wire 214 is a $\pi$ phase feed line. Wire 216 is a $3/2\pi$ phase feed line, and wire 211 is a horizontal control line. Control lines 209 and 211 can be connected to the controller 310 in order to control which phase is active on any given node 204. Single antenna control can be on a chip 206, while the actual node radiator or antenna 208 may be formed as a circular element surrounding the geometric center of the node 204. It should be understood that either a single controller or a plurality of controllers may control one or more of power transmission grids.

An exemplary algorithm of control logic 310 for system 100a might be as follows: (1) the power receiver 330 can use the communications channel 110a to declare its presence to any transmitters 330a in the vicinity; (2) the power transmitter 330a may communicate its presence on the communications channel 110a and start transmitting with only one of its antennae 208 or nodes 204; (3) the power receiver 330b may acknowledge receiving the faint signal on the communications channel 110a; (4) the power transmitter 330a switches on another antenna 208 or node 204 with a default phase of zero and may ask the receiver 330b over the communications channel 110a for signal strength; (5) the power receiver 330b may send back a signal indicating that the received signal is higher, the same, or lower than before; (6) if the signal is lower than or the same as before, the controller 310 may cause the phase at node 204 to increase its phase by $\frac{1}{2}\pi$ and request another signal strength transmission; (7) steps 5 and 6 are repeated for all phases; (8) if no increase in signal strength is observed then that particular node 204 is switched off and another node is used in the process, repeating from step 4; (9) steps 4-6 are repeated until all emitters nodes are in use.

In another example, step (6) may include increasing the phase over a three-phase cycle that includes 0, $\frac{1}{2}\pi$, and $5\pi/4$ radians. In this manner, the approximate shape of the whole sinusoidal curve may be determined. Accordingly, the phase angle of the peak power may be determined. Also, since when adding up tuned antennas, the next added antenna received power may only be a small percentage of the total power received. Thus, adding the second antenna may increases the power by 4×, while adding the 101st antenna may add 2% to the power and the 1001st may add 0.2% to the total power received. This may make it difficult to detect the actual power gain/loss from the tested antenna. Therefore, only a few antennas may be powered up during the testing cycle, and the phases for each antenna tested may be remembered. Once the full array's phases have been determined, all the elements may be switched on to deliver power.

Alternatively, all of the antennas in the power transmitted may be re-tuned, possibly by moving their phases slightly around their current values, and detecting the impact on the received signal. If it improves in one direction, (e.g., advancing or retarding the phase), the phase may continue to be cycled/incremented until there is no improvement to either side. This will depend on the ability to detect the change in received power level for a large array, otherwise, the whole array might be required to switch off and re-establish the phases from scratch.

Figure 3A:
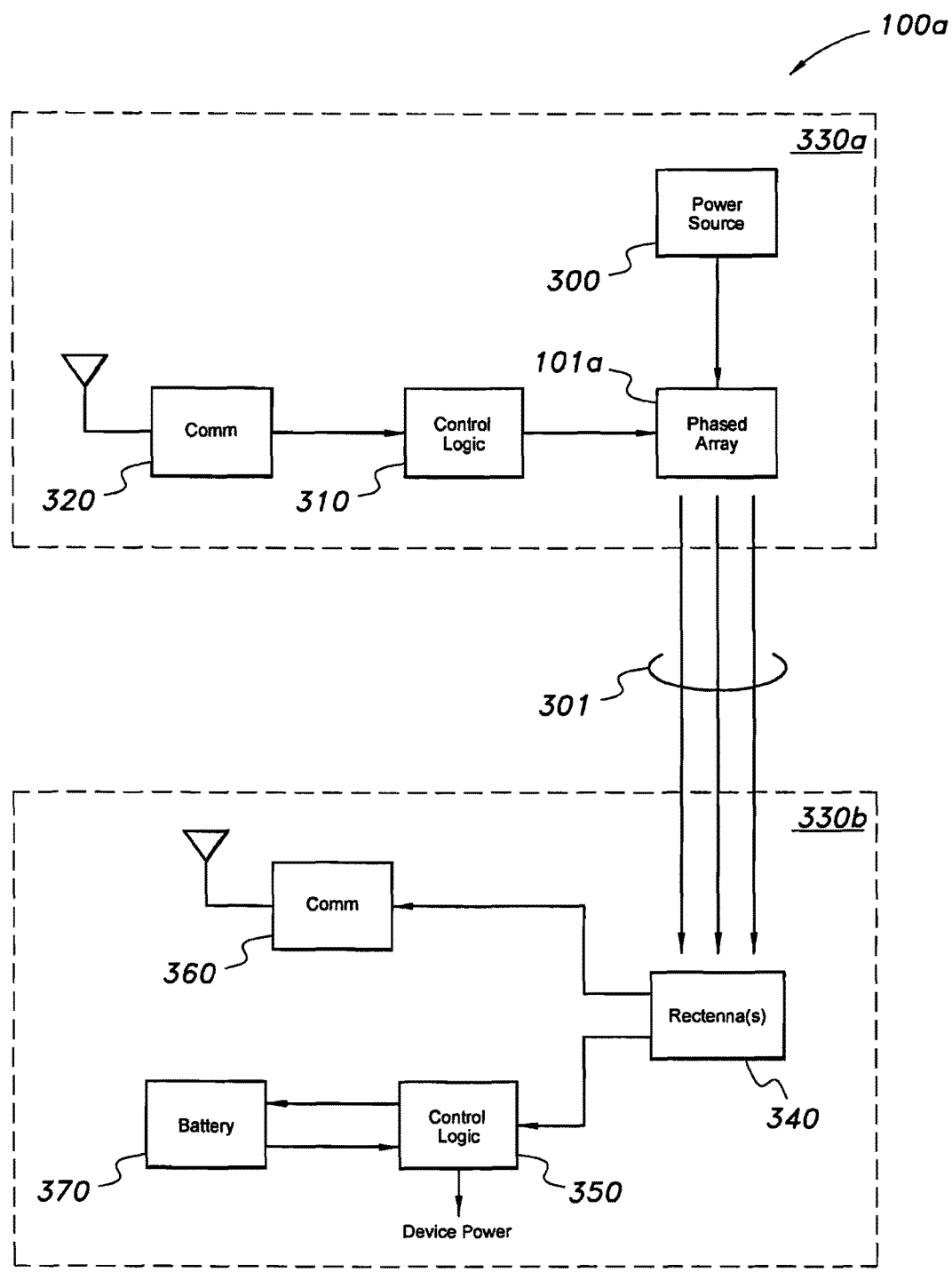
FIG. 3A is a block diagram of the first embodiment of the wireless power transmission system according to the present invention.
Figure 3B:
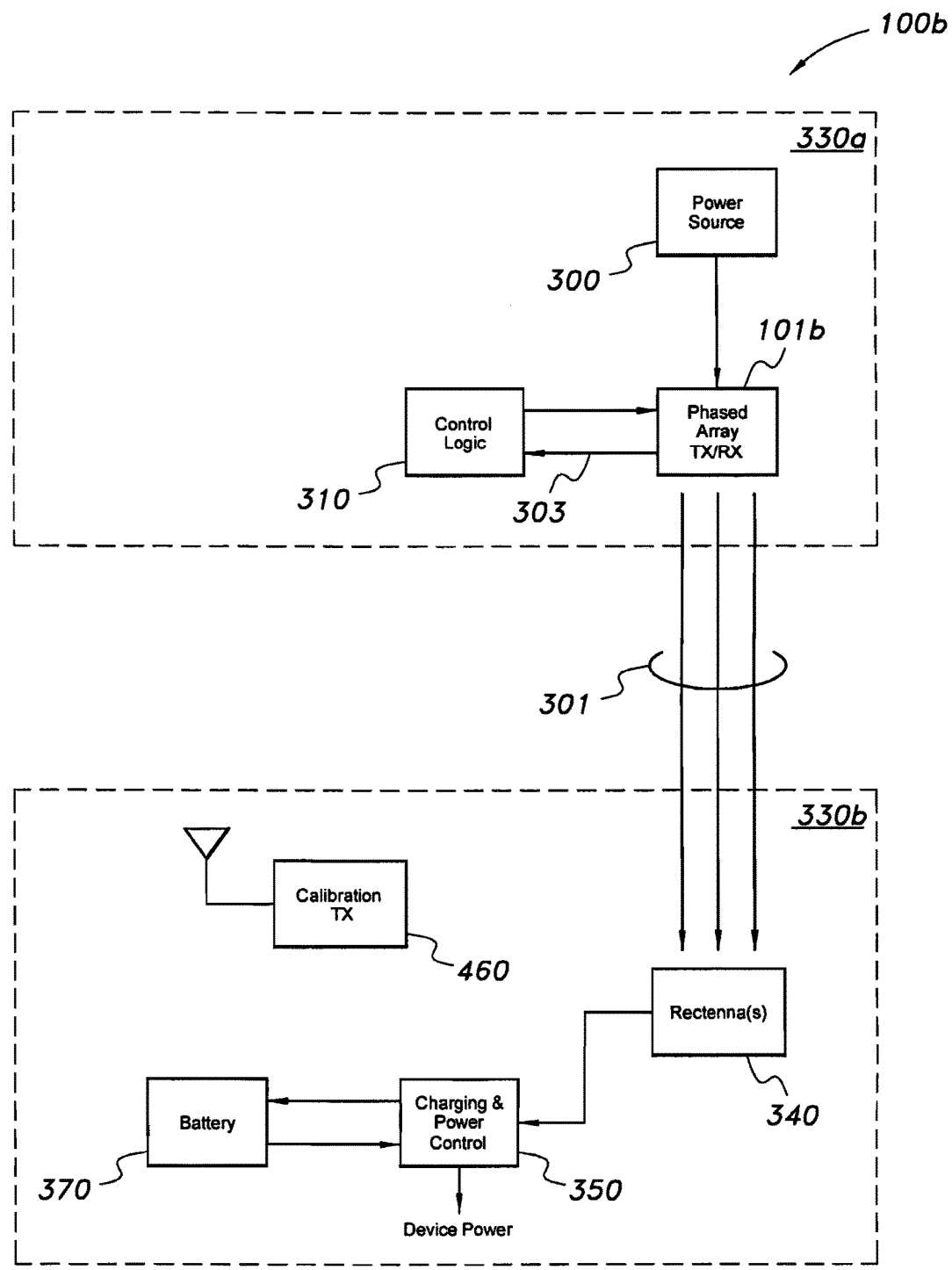
FIG. 3B is a block diagram of the second embodiment of the wireless power transmission system according to the present invention.

In a second embodiment, as most clearly shown in FIGS. 2B and 3B, each array element or node 204 can be set to receive a calibration signal from a calibration transmitter 460 in the power receiving system 330b. Each array element or node 204 can send the received calibration signal detected at that node 204 to the control logic 310 via data line 303. Subsequently, either controller 310, controller 206, or both controllers in combination may set each array element or node 204 to the detected phase for that element as a transmitting phase in order to send an optimized power transmission 301 back to the power receiver 330b. In both embodiments 100a and 100b, a configuration memory device may be in operable communication with the controller logic 310 in order to enable the array to transmit power to a specific location or "hotspot" without first having to communicate to the device to be charged 102. This feature is useful in sending power transmission 301 to the device to be charged 102 when the device to be charged 102 has no reserve power to establish communications channel 110a or 110b.

Alternatively, the second embodiment may operate as follows to utilize two way capabilities in the receiver and every transmitter antenna, such as that in a transceiver. A controller may prepare every transceiver to receive the beacon signal from the power receiver, (i.e., device to be charged). The device to be charged then sends out a beacon signal, (e.g., calibration signal that may be the same frequency as the phased array via, for example, a wireless communication between the array and the receiver to sync up their clocks), that traverses all open paths between the device to be charged and the power transmitter. The received signal at the power transmitter is equivalent to the sum of all open paths between the receiver and transmitter's antennae that lands on each antenna in the power transmitter, with the sum of each path adding up to a specific power level and phase at every specific power transmitter antenna.

Each antenna in the transmitter array compares the incoming signal with an internal signal to detect the received phase. Once the received phase is established by all the transmitter's antennas, each antenna transmits back at the complex conjugate of the received phase with its full power.

In addition, since the above tuning of the array takes into consideration all possible paths, (e.g., there is no assumption that there is a direct open path between array and receiver or that the receiver moves in smooth and linear motion in the environment), any changes to the configuration of the environment may be equivalent to the receiver being moved or the power transmitter array's physical configuration being changed. Therefore frequent re-tuning of the array may be required constantly, (e.g., 10 or more times per second).

Since retuning the antenna array requires shutting off the power being sent to "listen" to the receiver's beacon signal, time may be lost that could have been used to power the array. Accordingly, the array may reduce the frequency of the retuning when the power level at the receiver does not change significantly in order to maximize the power delivery to the receiver. When the power reception at the receiver drops, the array may increase the frequency of the updates until the receiver power stabilizes again. Specific limits on the frequency of the tuning may be set up, such as a minimum of 10 tps (tunings per second) to a maximum of 500 tps, since very high frequency retuning might lower the efficiency of the power transfer beyond usefulness.

Alternatively, the tuning of a number (n) antennas may be performed as follows. All n antennas may be switched off. One of the n antennas is then turned on and left on as a reference for each of the other n antennas to tune. Each of the rest of the n antennas are then turned on, their optimal phase is recorded, and they are then turned off. When this sequence is performed on the nth antenna, all antennas are turned on at their respective optimal phases.

With respect to the first embodiment having a moving receiver, all of the transmitter antennas may need to be re-tuned, for example by moving their phases slightly around their current values and detecting the impact on the received signal. If it improves in one direction, cycling/incrementing the phase continues until there is no improvement to either side. This may depend on the ability to detect a change in the received power level for a large array, otherwise, the whole array might be required to switch off and re-establish the phases from the beginning.

An exemplary array 101a or 101b can be a 30×30 grid net of approximately one meter per side, with each intersection of wires having a single transmission antenna or node 204. Preferably array grid 101a or 101b is made of flexible/soft materials. Flexibility of grid material enables a user to physically configure the microwave array emitter grid 101a or 101b in a substantially non-uniform, non-coplanar manner, i.e., spread out, but not flat, in order to minimize mirror focal points caused by, for example, flat, two dimensional arrays, and blind spots that ordinarily occur in flat, regularly disposed arrays having discrete phase differences. As shown in FIGS. 1A-1B, either array 101a or array 101b is sufficiently flexible so that it can be draped over a support structure, such as potted plant S, to provide the preferably non-uniform, non-coplanar configuration.

In this manner, the inverse-square law is successfully challenged, since the phased antenna is directional, thereby creating gain via a constructively phased beam signal that can be received at the receiving device 102. Moreover, use of a phased array, such as 101a or 101b, obviates the necessity of using a more cumbersome, unsightly device such as a physical directional antenna, i.e., a dish, a Yagi, or the like. Additionally, due to the efficiency of the power transmission process, low power may be used for the transmission such that the electromagnetic (EM) signal can have most of its strength proximate the receiving device instead of spread all over, in order not to harm the environment or cause interference with devices located elsewhere.

Once the signal is received and its power is available, the process of converting the approximately 5.80 GHz AC current coming from the antenna into a DC current to charge the battery 370, power storage capacitor, or the like, is done with lower voltage rectifiers capable of the task. These rectifiers can either be based on small area Schottky diode or utilize a resonance with a 5.80 GHz oscillating circuit in the same phase as the received signal, thus enhancing its power to the point of overcoming the voltage drop of the diodes used in the rectifier portion of the rectenna 340. It should be noted that multiple devices may be charged by time sharing the array, or by superimposing phases of the antennas in order to simulate a multiple beam configuration.

The charging mechanism described above operates when the transmitter and receiver are in communication with one another. However, a method for charging a receiver that has no power to communicate may be beneficial as well. To accomplish this, a location, or locations, that will receive a periodic power transmission burst may be established.

In one example of how to charge a device having no battery power, a beacon device, or resurrector, (not shown) may be placed in the location to receive the periodic power transmission burst or on demand by the user. The beacon device communicates with the power transmission grid, such as by transmitting a beacon signal, and the power transmission grid recognizes that beacon signal phase configuration as a location to transmit a periodic power transmission burst, (e.g., a one second burst every ten minutes, or a 0.1 second burst every minute with a one second burst every ten minutes). The beacon signal transmitted from the beacon device may be reflected and/or refracted through various media before it arrives at the power transmission grid. Accordingly, multiple beacon signals may be received by the power transmission grid. When the power transmission grid receives the one or more beacon signals, the open path(s) from the location of the beacon device to the power transmission grid may be established.

The power transmission grid may then aggregate the beacon signals to recreate the waveform of the transmitted beacon signal. From this recreated waveform, the power transmission grid can then transmit the power transmission burst as, for example, a reverse waveform of the recreated waveform to provide a power burst at the location established by the beacon device. In one embodiment, the reverse waveform may be determined by taking the complex conjugate, or mathematically equivalent transform, of the waveforms received from the beacon device. The beacon device can be turned off once the location to receive a periodic power transmission burst is established.

The device to be charged 102 that has no battery power can then be placed at that location where it will receive the periodic power transmission burst until it has enough power to communicate with the power transmission grid to undergo the charging process described above. The device can then be moved away from that location.

Once a device to be charged 102 is moved from one location to another, or the power transmission grid is moved, the power transmission grid may re-tune itself, (e.g., re-align transmission antennas), to establish the best transmission power to the device to be charged 102. This re-tuning may occur in response to the device 102 reporting a drop in power or in regular intervals, (e.g., 1 ms-10 s). However, the regular interval may be shortened or lengthened depending on how well the signal power is maintained by the receiver, while continuing to re-tune regularly despite no drop in power.

The transmitter antennas may also take the form of including circuitry into a single chip and daisy chaining the chips with wires to create long strips of "phased wires" that may be configured and used in various shapes and designs. Constructing complex arrays with thousands of antennas and associated controllers through strings of "phase control" chips, the wires between the chips may serve as the data paths connecting the chips to a common controller, while at the same time, the wires may also act as the transmitting/receiving antennas themselves. Each chip may have more wires coming out of it acting as antennas. Each antenna may be given an address, (e.g., a, b, c, and the like), allowing the chip to control the phase of each antenna independently from the others. Additionally, the wires may be configured in all sorts of arrangements, depending on available space since the tuning of the array is irrespective of the antenna locations and arrangements.

Since the antenna chip controllers are connected through short wires, the wires may be utilized as antennae in several ways. For example, the wires themselves may be driven by oscillators and/or amplifiers, or a shield may be used around the wires, with the shield itself driven and used as an antenna, thus preventing the communication wires from shielding the signal in multi-layers arrays.

Figure 4:
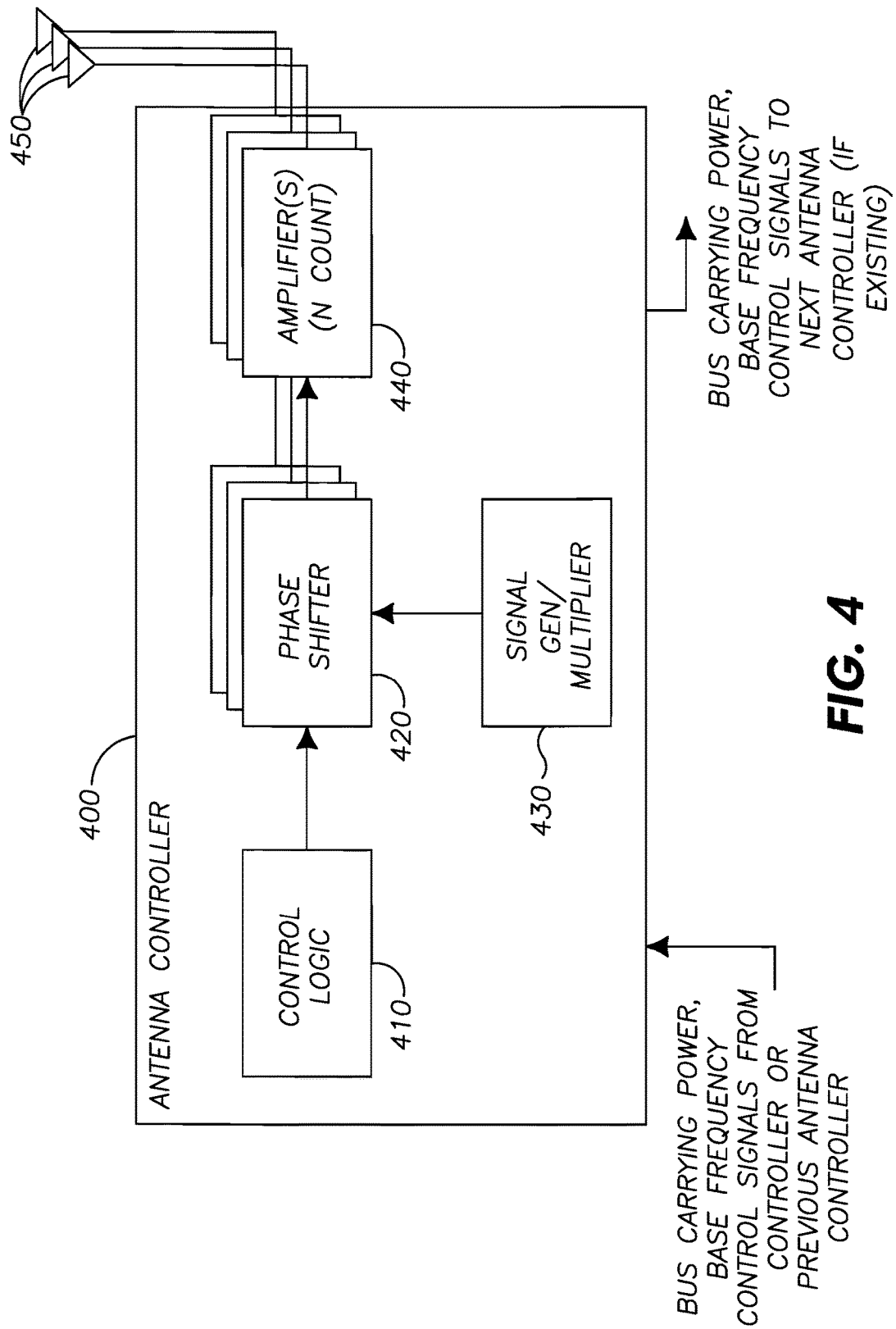
FIG. 4 is a block diagram of an alternative first embodiment power transmitter.

FIG. 4 is a block diagram of an alternative first embodiment transmitter. The transmitter may be an antenna controller 400 that includes a control logic 410, phase shifters 420 (N Count), signal generator/multiplier 430, amplifiers 440 (N Count), and (N) antennas 450. The antenna controller 400 receives power and base frequency control signals, as well as other commands and communication signals, on a common bus from a single controller that controls all antenna controllers or from a previous antenna controller 400. The power signal, for example, may be received by a power supply of the transmitter 400 (not shown), while the base frequency control signal may be received by the signal generator/multiplier 430, and the communication signals and commands may be received by the control logic 410. In the case where each previous antenna controller 400 provides the power and base frequency control signals, a bus carrying those signals may continue on to the next antenna controller 400. The control logic 410 may control the phase shifter 420 to cause it to adjust the phase of the amplifiers 440. The signal generator/multiplier receives the signal from the bus at, for example 10 MHz, and converts it up to for example 2.4, 5.8 GHz and the like for wireless transmission.

Figure 5:
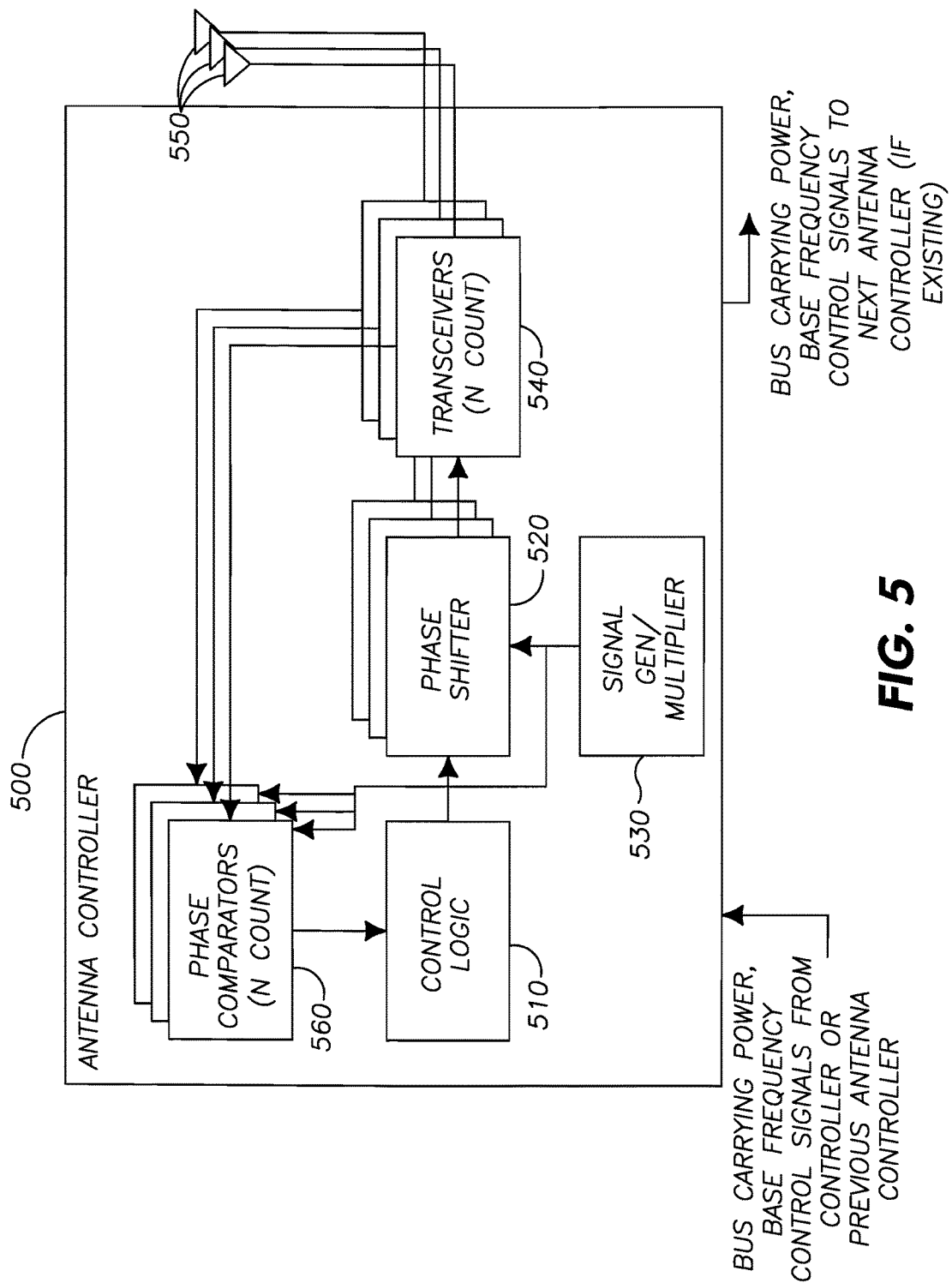
FIG. 5 is a block diagram of an alternative second embodiment power transmitter.

FIG. 5 is a block diagram of an alternative second embodiment transmitter. The transmitter may be an antenna controller 500 that includes a control logic 510, phase shifters 520 (N count), signal generator/multiplier 530, transceivers 540 (N Count), (N) antennas 550, and phase comparators 560 (N Count). The transceivers 540 receive the calibration or beacon signals from the receivers and forward the signal to the phase comparators 560. The phase comparators 560 determine the phase of the received signals of their respective transceivers 540 and determine an optimal phase angle for which to transmit the power signal. This information is provided to the control logic 510, which then causes the phase shifter 520 to set the phase, (e.g., at the complex conjugate of the received beacon/calibration signal), of the transceivers and transmit the power at that set phase. The signal generator/multiplier 530 performs a function substantially similar to the signal generator/multiplier 430 of the antenna controller 400. In addition, the bus signals are similar to those in the transmitter 400, with the signals being received, for example, by the counterpart components in transmitter 500.

Figure 6:
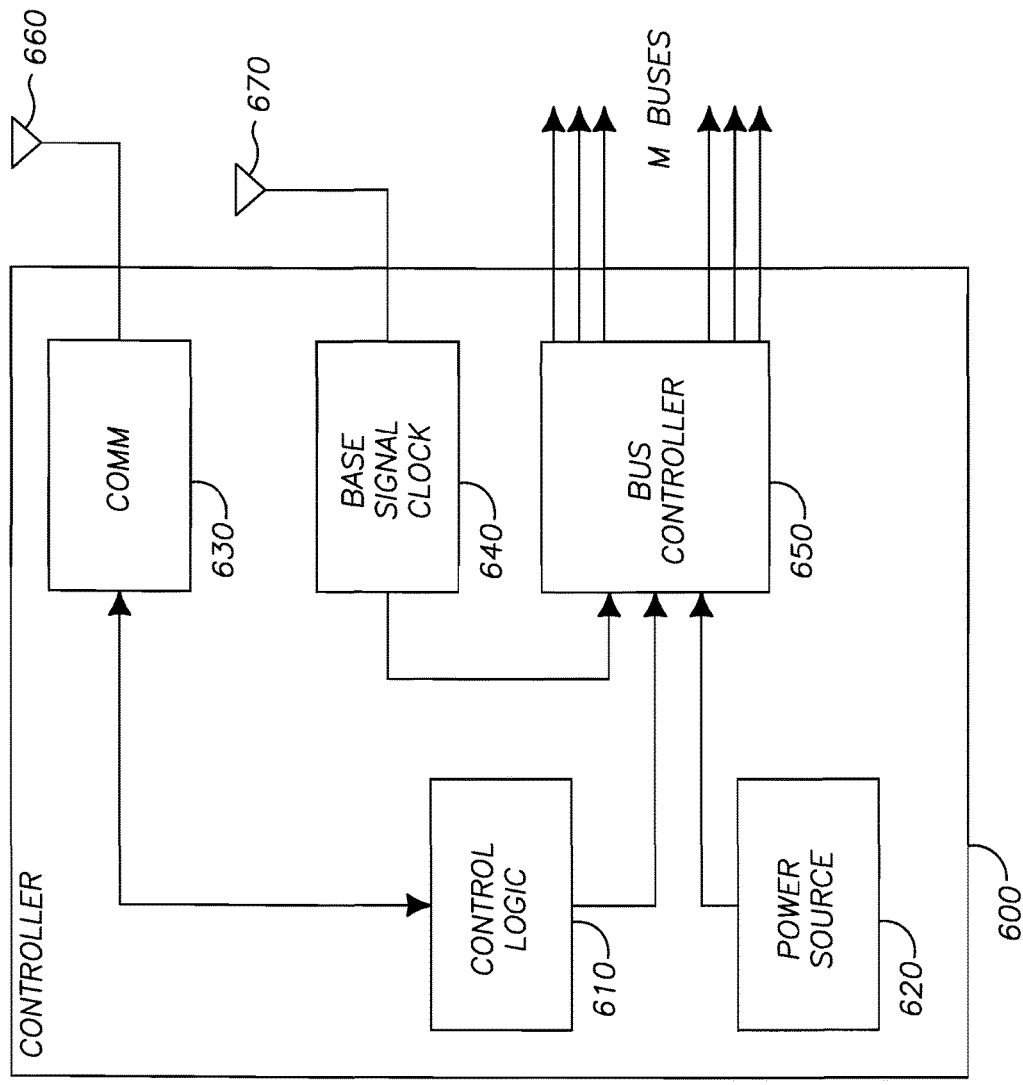
FIG. 6 is block diagram of a controller.

FIG. 6 is block diagram of a controller 600 for controlling, for example, the antenna controllers of FIGS. 4 and 5. The controller 600 includes a control logic 610, power source 620, communication block 630 connected to an antenna 660, base signal clock 640 connected to an antenna 670, and bus controller 650. The control logic 610 controls the bus controller 650, which transmits signals out on M buses to M number of antenna controllers, (e.g., 400 and 500). The power source 620 provides a source of power to the bus controller 650. The communication block 630 transmits and receives data from a receiver over its respective antenna 660. The base signal clock 640 transmits the base signal to other controllers and may also send/receive transmissions to the receiver for synchronization. One controller 600 may be utilized to control all transmitter antennas or several controllers 600 may be used where one controller 600 controls a group of antennas. Additionally, it should be noted that although separate communication blocks and base signal clock, having respective antennas are shown, the functionality may be incorporated into one block, (e.g., the communication block 630).

Figure 7:
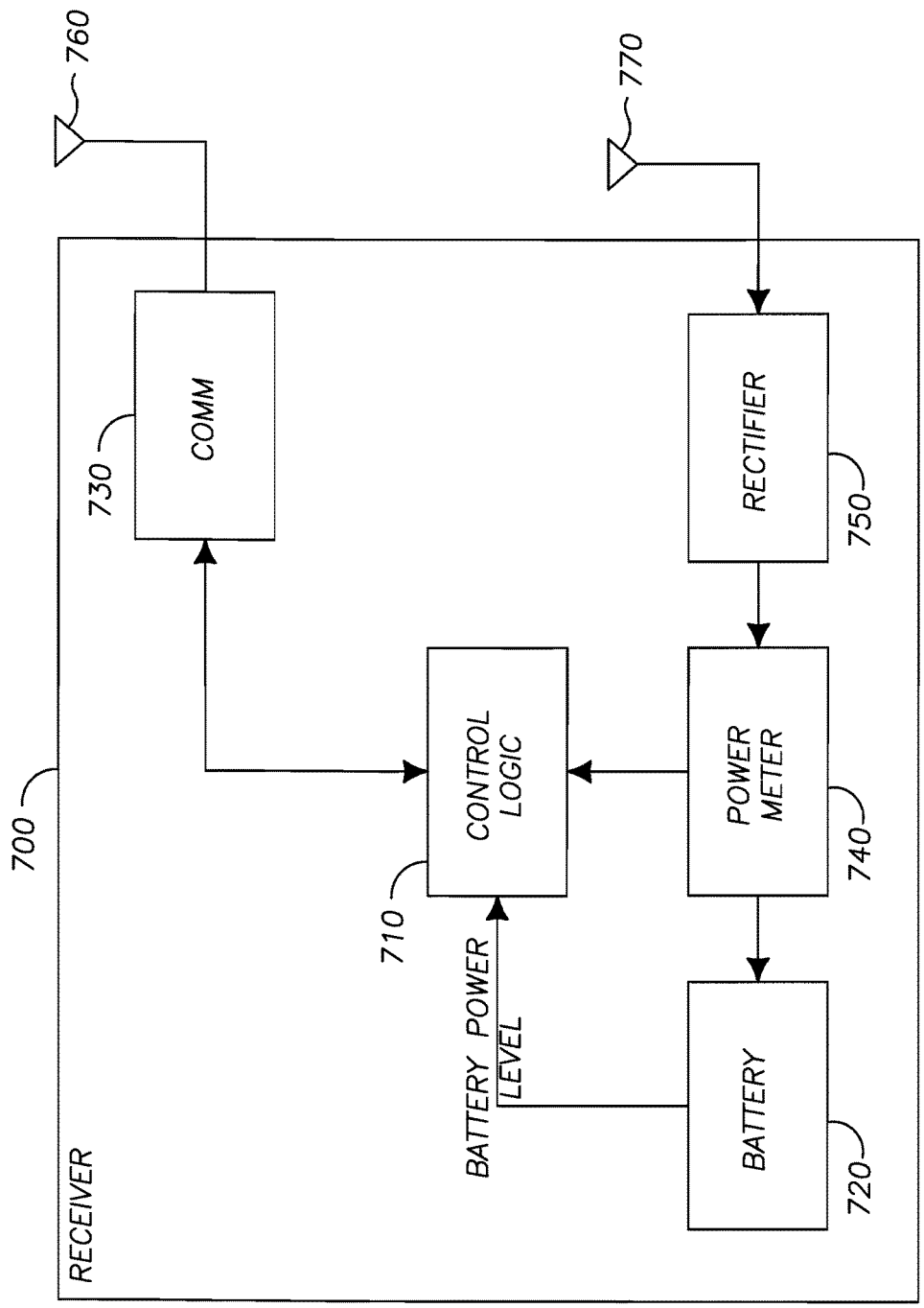
FIG. 7 is block diagram of an alternative receiver in accordance with the first embodiment.

FIG. 7 is block diagram of an alternative receiver 700 in accordance with the first embodiment. The receiver 700 includes a control logic 710, battery 720, communication block 730 and associated antenna 760, power meter 740, and rectifier 750 and associated antenna 770. The control logic 710 transmits and receives a data signal on a data carrier frequency from the communication block 730. This data signal may be in the form of the power strength signal transmitted over the side channel described above. The rectifier 750 receives the power transmission signal from the power transmitter, which is fed through the power meter 740 to the battery 720 for charging. The power meter 740 measures the received power signal strength and provides the control logic 710 with this measurement. The control logic 710 also may receive the battery power level from the battery 720 itself.

The receiver 700 may be synchronized with, for example, the controller 600 by having the controller 600 transmit the base frequency signal via the antenna 670. The receiver 700 may then use this signal to synchronize a beacon signal, or calibration signal, that the receiver transmits back to the controller 600. It may also be noted that this technique may be utilized with multiple controllers as well. That is, where multiple transmission arrays are being utilized, the controllers may be synchronized with one another by utilizing a base frequency signal sent from one of the controllers.

Figure 8:
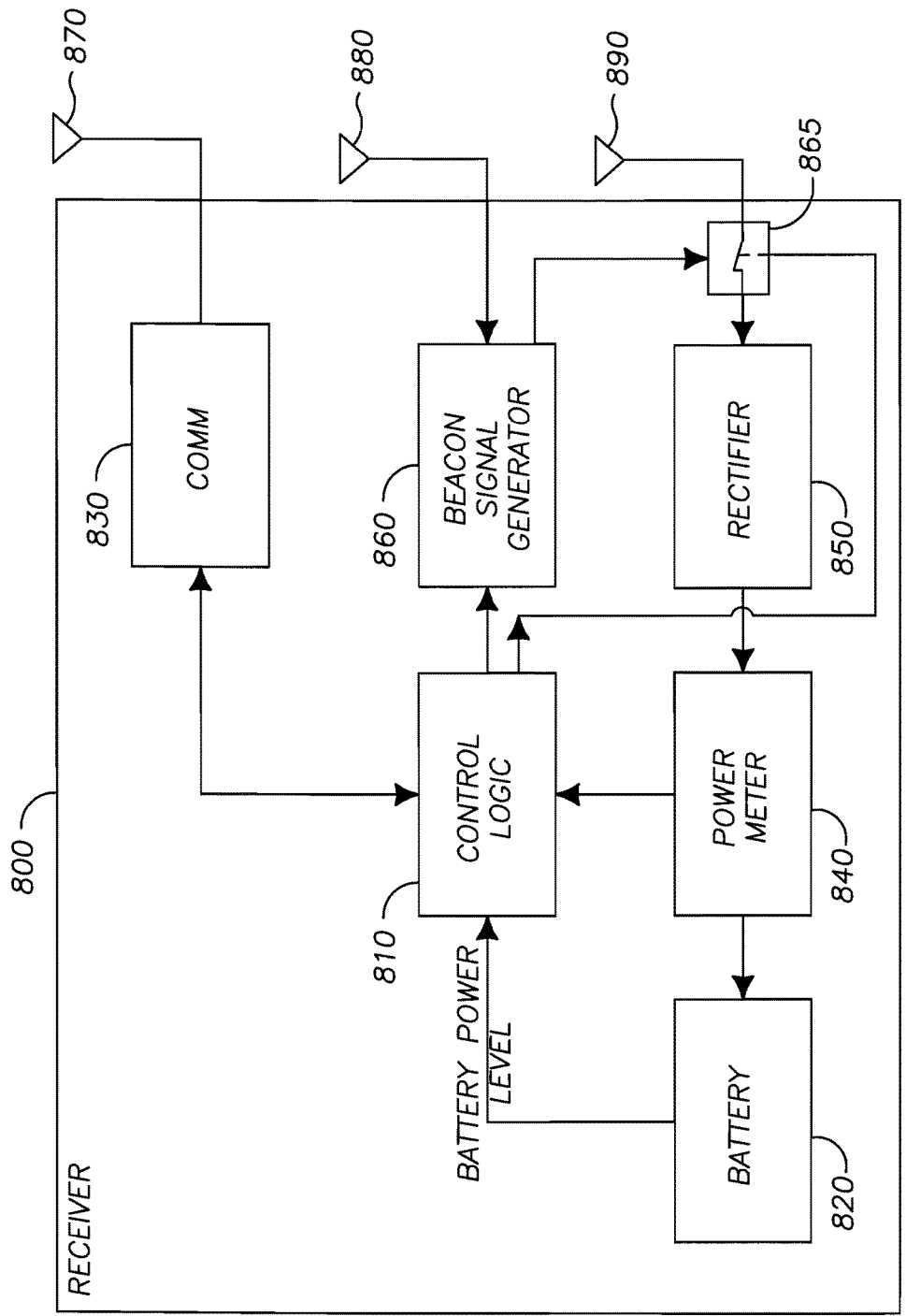
FIG. 8 is a block diagram of an alternative receiver in accordance with the second embodiment.

FIG. 8 is block diagram of an alternative receiver 800 in accordance with the second embodiment. The receiver 800 includes a control logic 810, battery 820, communication block 830 and associated antenna 870, power meter 840, rectifier 850, beacon signal generator 860 and an associated antenna 880, and switch 865 connecting the rectifier 850 or the beacon signal generator 860 to an associated antenna 890. The rectifier 850 receives the power transmission signal from the power transmitter, which is fed through the power meter 840 to the battery 820 for charging. The power meter 840 measures the received power signal strength and provides the control logic 810 with this measurement. The control logic 810 also may receive the battery power level from the battery 820 itself. The control logic 810 may also transmit/receive via the communication block 830 a data signal on a data carrier frequency, such as the base signal clock for clock synchronization. The beacon signal generator 860 transmits the beacon signal, or calibration signal using either the antenna 880 or 890. It may be noted that, although the battery 820 is shown for being charged and for providing power to the receiver 800, the receiver may also receive its power directly from the rectifier 850. This may be in addition to the rectifier 850 providing charging current to the battery 820, or in lieu of providing charging. Also, it may be noted that the use of multiple antennas is one example implementation and the structure may be reduced to one shared antenna.

Since the transmitter's antenna control circuits and the receiver power and control circuits may be built as Integrated Chips (ICs), and may share several key circuit components, the two chip functionalities may be designed as a single chip, and by choosing different packaging or configuration, the chip may function as either a transmitter or receiver. That is, the same chip with certain portions enabled or disabled may be utilized as a transmit antenna controller or a receiver controller. This may reduce the cost of building and testing two different chips, as well as save on chip fabrication costs, which may be significant.

As discussed above, the shape of the transmission grid may take on many varieties. Accordingly, the packing of the antennas could be close enough to around half a wavelength of the transmitted power signal, to several times the wavelength. Two-dimensional arrangements could be made to allow the array to be laid flat under a carpet, or draped over attic heat insulation. For example, multiple wide wires, (e.g., narrow strips of a two-dimensional array), may be employed that contain multiple transmitting antennas. These wide wires could be installed in flooring or within walls. Alternatively, the power transmission grid could be in the form of loop antennas, or any other shape.

Three dimensional arrangements might pack the largest number of antennas and can be incorporated into convenient forms such as office ceiling tiles, doors, paintings and TVs—thus making the array invisible and non-obtrusive. Also, grid arrays may be formed in several layers stacked behind one another, allowing for a higher density antenna. In this example, the array acts similarly to a "phased volume" having a single forward beam with a minimum of a mirror beam behind it. The mirror beam may be reduced as the thickness of the phased volume increases.

That is, perfectly flat phased arrays using omni-directional antennae may create two "images" of the formed wavefronts symmetrically around the plane of the array, (e.g., when there is free space or an identical environment on opposite sides of the array). This could have undesirable consequences of reducing the power delivery, (e.g., 50% of the power going to the backplane), and thus reducing the efficiency of the transfer. Arranging the array antennae in non-planar form may reduce this symmetrical wavefront even if it has a 3-dimensional array symmetrical design, due to the fact that the antennas will have different phases on across the symmetrical sides of the array, making the signal non-symmetrical and non-"mirrored".

When the array is phase tuned for a particular receiver, every antenna in the array has a specific phase to which it transmits to create a signal that reaches that particular receiver. Two or more receivers can be configured to receive power by one or a combination of the following techniques.

In a first technique, time sharing the power delivery may be utilized between the different receivers. This can be done by tuning the antennas in the array to one receiver, and then switching to the next receiver, giving each receiver an equal (or unequal) amount of time. The tuning of the array to each receiver may be done from memory or by re-tuning the array using a process similar to the second embodiment technique.

In another technique, phase modulating all the array antennae to create multiple power spots may be utilized. For each antenna, the received signal is a vector with the phase being the received angle, while the magnitude is the power level of received signal. To create the returned signal to multiple receivers, the phase of the transmission may be determined as being the angle of the sum of the received vectors. Although it may not be necessary to utilize the magnitude of the received signal and transmit from each antenna at normal transmission power, in order to create a biased multi-focus signal that performs better when multi-path signals are considered, the peak received signal power from each receiver may be discovered, and the vector addition may be biased by scaling the vectors against a normalized scale, (e.g., peak power from each receiver may be considered of magnitude 1.0 for the peak power). The addition of the vectors may ensure that each antenna provides more power to the receiver that it delivers more power to, or, alternatively, receives more power from.

Antenna sharing is another technique. By dividing the whole array to multiple sub-arrays, each may dedicate its power to a specific receiver. This approach may be beneficial when the array is large enough to be efficient when divided.

Separate arrays may be used in unison, where the individual array units synchronize their base signal clocks using a shared over the air frequency to achieve a continuous signal from a designated "master" unit, allowing all "slave" transmitter controller units to add up their waveforms coherently. This allows the separate arrays to be distributed in the environment, giving the users flexibility in arranging multiple arrays around the building, living quarters, manufacturing plan or offices. During setup of these controllers, an installer/manager may link the different controller arrays to each other by designating a master unit along with failover sequences such that no matter how many arrays fail, the system will continue working using the available arrays. For example, the arrays may be set by synchronizing them using an atomic clock. That is, separate array units may work without synchronizing on a base frequency by using accurate atomic clocks, (e.g., greater than 1:10^10 accuracy), if the separate array units utilize a single frequency to use for power transmission. In this case, they would be in phase for fractions of a second, allowing coherency of phase/signal to be maintained.

In another power transmission technique, the transmitter may send out a regular signal at the side communication channel broadcasting its presence to all receivers. If there are other transmitters in the vicinity, it ensures to use one of the agreed upon frequencies, or avoid signal collisions by monitoring other transmitter's signals. These broadcast announcements can vary in frequency from several per minute to less than one per minute. The receiver may send out a signal announcing its presence, and the transmitters may negotiate to find which one is the most suitable for the power transfer. Once decided, the receiver "locks" onto a single transmitter. This may require that each transmitter is defined as a logical (single controller) device—which could be made up of multiple linked transmitters. If the controller detects that the power envelope has changed, (i.e., a receiver is not requiring the same power), the controller may continue to provide power so that the receiver will not fail.

In another power transmission technique, the transmitters could be set up such that they are open to serve power to any wanting device, or they could be "paired" with the devices they should serve. Pairing avoids the problem of the neighbors borrowing power from each other unintentionally, which could affect the efficiency from the transmitter's owner's point of view. When the transmitter is confronted with multiple receivers, it may want to establish a hierarchy for prioritization, such as giving the most needy devices the power first, which could be established on one or more predefined criteria.

For example, some of the criteria may include: the device is of critical importance to its owner, (e.g., a cell phone as opposed to a toy); the device does not typically spend all day in the vicinity of the transmitter, (e.g., a TV remote control compared to a cell phone); or the device is found to need immediate power or it will fail. Such devices may be given higher priority over others until they reach non-critical power. Alternatively, a user customized priority may be utilized, whereby the user decides which device should get the highest priority.

The example prioritization preference described above may be pre-installed into the transmitter system, (e.g., in the control logic), with the ability to be overruled by the installer of the array, ensuring that the system is delivering on the prioritization of the owners/users. The owner or user may also desire whether the array would be open to deliver power to any device, or may desire to register specific devices as highest priority or least priority. Additionally, the user or owner may desire to determine whether or not to maintain power to a specific device even if it is moving.

In the second embodiment array tuning algorithm, the transmission of power has to be stopped as the array re-tunes to a new location of the receiver. If these re-tune operations are done at a high frequency due to fast movement of the receivers or due to rapid changes in the configuration of the environment, the time needed to keep the array turned off while receiving a new beacon signal could reduce the power delivery efficiency. Accordingly, to counteract this, more than one frequency may be used by the array/receiver. While one frequency is being tuned, another frequency may continue to transmit power, then the subsequent frequency is tuned until all the frequencies have been re-tuned, thus avoiding any stopped gaps in the transmission.

When designing large phased arrays, having to send the required frequency to every antenna may be difficult due to the large number of cables, (e.g., coaxial). This may be even more difficult when the number of antennas reaches over 1000. In another alternative, therefore, instead of sending a high frequency signal (>1 GHz) to all the antennas, a lower frequency signal (~10 MHz) may be transmitted through to all the antennas, and every antenna would have frequency multiplication circuitry such as Phased Locked Loop (PLL) and phase shifter.

Additionally, a standard format battery, (e.g., AA, AAA, C-cell, D-cell or others), with ability to receive power and recharge itself might be desired as a replacement for a disposable or rechargeable batteries used in an electronic/electrical device. This would require the battery to have all the circuitry needed to communicate with the transmitter array, as well as have charge/energy capacitance to be used to run the device the battery powers.

The device often requires voltage or current to activate the components or battery capacitance to ensure long operation between battery swaps, that exceeds the capability of single battery. Therefore multiple batteries are often used in series or in parallel. However, with a single receiver battery, only one battery can be necessary for device operation, since the battery can deliver the required voltage and the energy capacity becomes a moot issue since the battery is able to receive copious amounts of energy to maintain operation perpetually without need for changing the batteries.

However, using a single battery in place of several batteries may not work due to the configuration of the device's battery storage area. Accordingly, additional techniques may be employed to overcome this.

Figure 9:
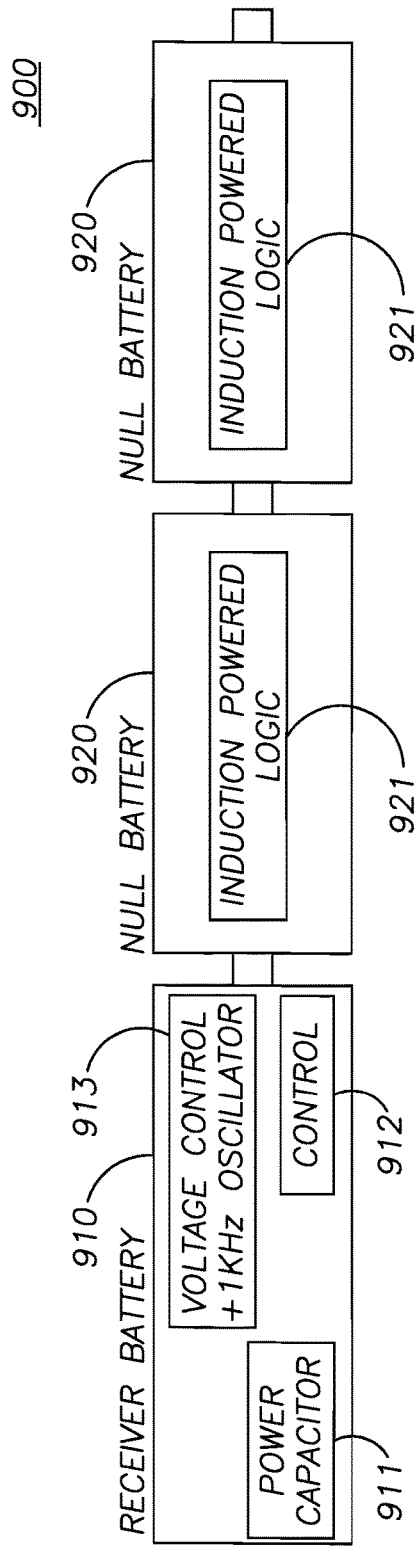
FIG. 9 is a block diagram of a receiver battery system.

FIG. 9 is a block diagram of a receiver battery system 900. The system 900 includes at least one receiver battery 910 and may include any number of null batteries 920. For purposes of example, one receiver battery 910 is shown and two null batteries 920, however, it should be noted that any number of null batteries may be utilized. The receiver battery 910 includes a power capacitor 911, a control circuit 912, and a voltage control oscillator 913. The null battery 920 includes induction logic 921.

Accordingly, the battery system 900 may operate as follows. Only one battery with the "receiver" enabled battery, (i.e., 910) is provided. However, used regular batteries placed in series with a good running battery may have their resistance build up over time, and they could leak once their lifetime usage is exceeded, among other problems that can occur.

Alternatively, "null" batteries, (i.e., 920), may be used in conjunction with a "power selector" on the receiver battery 910. The null batteries 920 in one example are devices with exact battery dimensions but with their anodes shortened, making the voltage of the receiver battery 910 drive the device unaided. The receiver battery 910 utilizes the control circuitry or slider 912 or other selection mechanism to allow the user to select the number of batteries he/she is replacing. The receiver battery 910 then outputs the desired voltage to compensate for the null batteries 920.

In another technique, intelligent null-batteries 920 as well as an intelligent receiver battery 910 may be used. The receiver battery will initially output the voltage of one battery of the desired format as well as 1 KHz (or similar other frequency) low voltage oscillation (<0.1V oscillation for the duration of detecting the number of null batteries used), and the intelligent null-batteries 920 use the 1 KHz to power themselves inductively. The null batteries now create an effect on the power-line by resistance, capacitance or other means that the receiver battery can detect. The frequency of effect of the intelligent null-batteries 920 is done by onboard quasi-random generators, (e.g., logic 921), that have the characteristic of being statistically additive. It can therefore be determined the count of the quasi-random generators on the line. One embodiment of this would be the use of a 32-bit linear feedback shift register running at a known interval, such that the shifted bit is used to trigger the effect "blips" on the power line. The seed number of the feedback shift registers on power up should be different on all the null batteries 920 so they do not work in unison.

Figure 10:
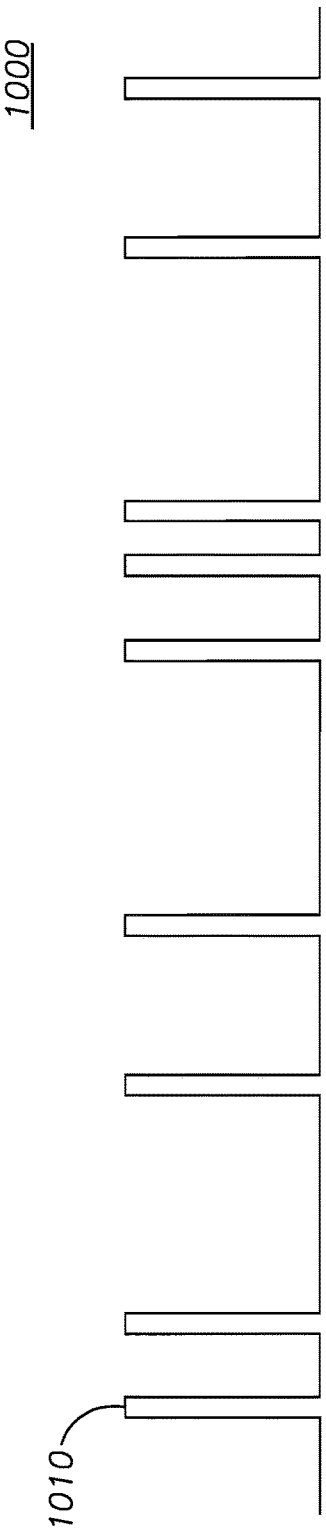
FIG. 10 is an example battery system power line diagram.

FIG. 10 is an example battery system power line diagram 1000, including "blips" 1010. The receiver battery 910 counts the blips 1010 on the power line and determines the number of intelligent null-batteries 920. The blips 1010 could be high frequency pulses or capacitance modifiers. Blips that are not masked out by most electrical/electronic devices may be chosen. This process is performed for a short period of time, for example, less than 1 millisecond. After that, the receiver battery 910 does not require voltage detection until a next power-up which could be in a different device with different power needs. The 1 KHz "power" frequency created by the receiver battery 910 stops and the null batteries 920 become dormant and become transparent to the device being powered.

Referring again to FIG. 10, random blips 1010 are generated by each of the two null batteries 920 over the power system line of system 900. The blips 1010 are used to determine the number of random blip generators by the receiver battery 910. By counting the blips over time, and dividing by the expected number from a single null battery 920, it can be determined the number of null batteries 920 installed in series. In a parallel battery installation system, however, one receiver battery 910 may be required for each parallel power line.

When a device is receiving power at high frequencies above 500 MHz, its location may become a hotspot of (incoming) radiation. So when the device is on a person, the level of radiation may exceed the FCC regulation or exceed acceptable radiation levels set by medical/industrial authorities. To avoid any over-radiation issue, the device may integrate motion detection mechanisms such as accelerometers or equivalent mechanisms. Once the device detects that it is in motion, it may be assumed that it is being handled, and would trigger a signal to the array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

Figure 11:
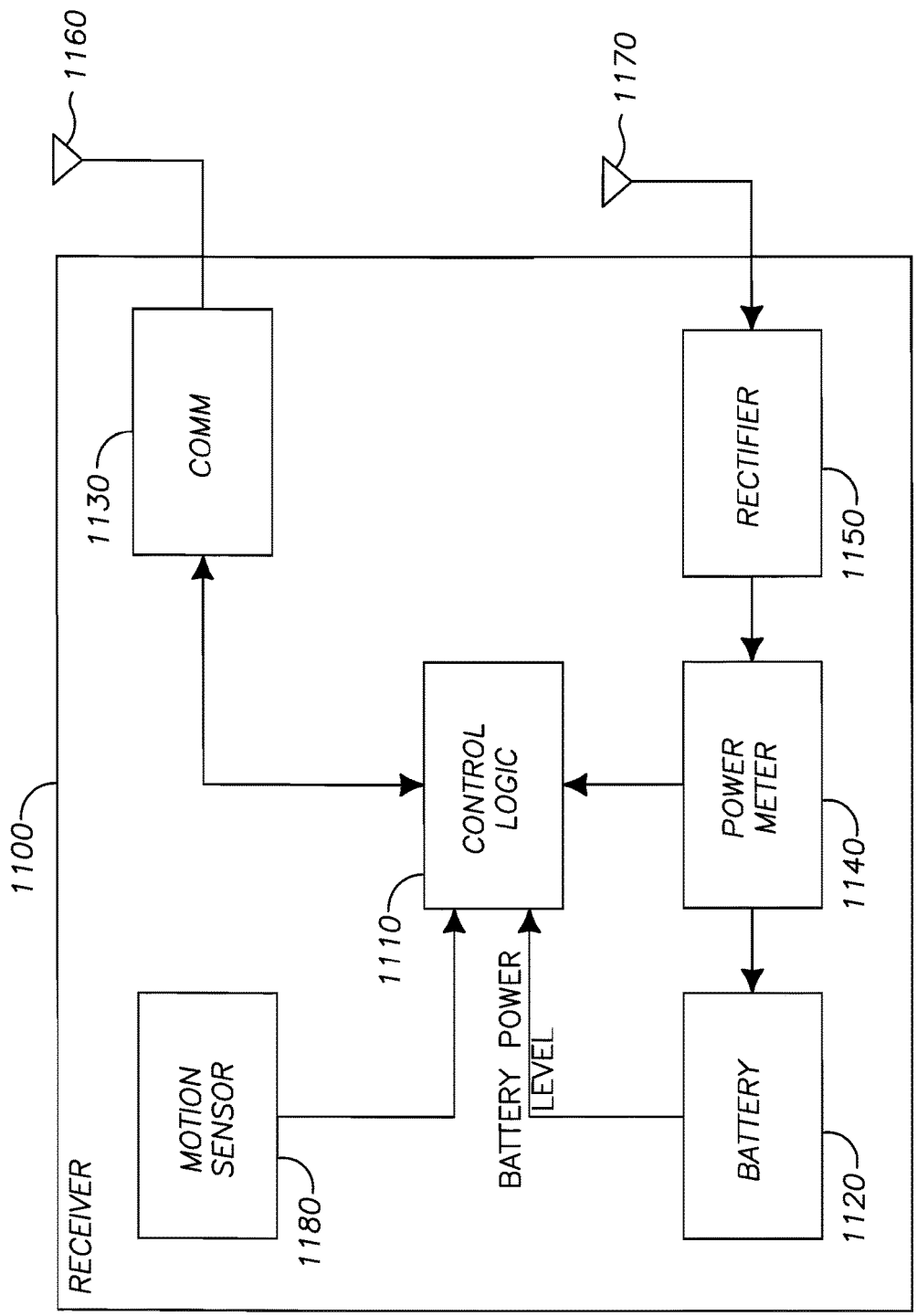
FIG. 11 is an alternative receiver in accordance with the first embodiment.

FIG. 11 is an alternative receiver 1110 in accordance with the first embodiment that includes motion detection as described above. The receiver 1100 includes a control logic 1110, battery 1120, communication block 1130 and associated antenna 1160, power meter 1140, rectifier 1150 and associated antenna 1170, and a motion sensor 1180. With the exception of the motion sensor 1180, the rest of the components operate functionally similar to the respective components of receiver 700. The motion sensor 1180 detects motion as described above and signals the control logic 1110 to act in accordance with the technique described above.

Figure 12:
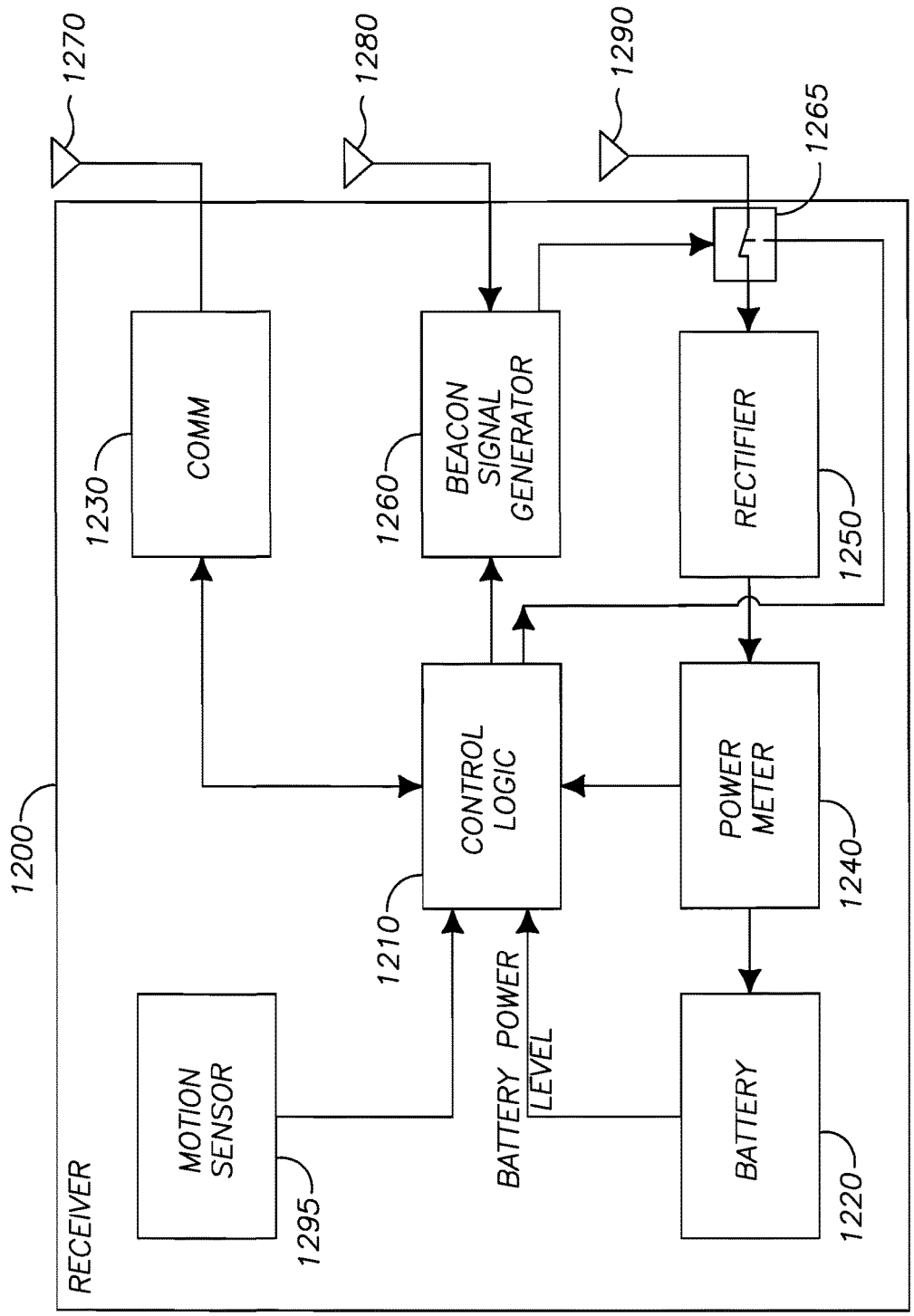
FIG. 12 is an alternative receiver in accordance with the second embodiment.

FIG. 12 is an alternative receiver 1200 in accordance with the second embodiment that includes motion detection as described above. Receiver 1200 includes a control logic 1210, battery 1220, communication block 1230 and associated antenna 1270, power meter 1240, rectifier 1250, beacon signal generator 1260 and an associated antenna 1280, and switch 1265 connecting the rectifier 1250 or the beacon signal generator 1260 to an associated antenna 1290. With the exception of the motion sensor 1295, the rest of the components operate functionally similar to the respective components of receiver 800. The motion sensor 1295 detects motion as described above and signals the control logic 1210 to act in accordance with the technique described above.

A device designed to receive power at frequencies used by WiFi communication or Bluetooth and the like such as a cell phone or media player might already have antennas capable of receiving power at the power transmission frequencies. Accordingly, instead of having additional antennas to receive the power, the same communication antennas used for the WiFi communication and the like may be used to receive power, by adding the required circuitry to the communication hardware, (e.g., adding rectification, control logic, etc.).

Some example uses of the wireless power transmission system may include supermarket and consumer retail outlets provide pricing tags on the shelves of the merchandise. Managing the price number on these tags can be an expensive and time consuming effort. Also, special deals and promotions mean that the tags would be changed daily.

With today's electronic ink signage, it is possible to have each tag made of a small electronic device that displays the prices/promotions quite effectively, and electronic ink consumes no power while displaying a static image. However, power is required to receive the new data to display and it is also required to change the electronic ink display. Having wires reaching every tag is not a feasible solution nor is having batteries in each tag. Since they would require charging or replacement regularly. By utilizing wireless power transmission, thousands of tags can be maintained operational from wireless power transmitter arrays placed in the ceilings or shelves; powering the tags on regular basis, as well as when a tag is moved. Once the tags arrive at the desired destination, the tags may be activated with initial power either wired or wireless.

In another example, manufacturing plants utilize a large number of sensors and controllers to maintain synchronization of production, overall productivity and quality of manufactured goods. Despite the use of wireless communication, it is still required to run power carrying wires to every device, which makes the devices dependent on one more components that mare prone to failure, and the devices cannot be hermetically sealed before installation for use in highly combustible environments such as oil refineries, since the devices need to have holes to bring the power wires into the device. Accordingly, wireless power may be provided to these devices by incorporating one of the wireless power receivers described above.

The wireless power system may also be utilized for motion detection. When the power transmission system is active, small disturbances in the environment can change the efficiency of the transfer, even when the change is not in the line of sight of the transmission. Since this system leverages the multiple paths (multipath) in the environment, it can be used as a motion detector. By measuring the power received from an array that is localized or distributed in the environment, any changes to the power level received will be an indication of changes to the electromagnetic configuration of the environment. It may be noted that in such uses, the power transfer level can be very small, since wires can power the receiver, but is acting only as means of tuning the array. Once a change in the environment's configuration is detected, the security system/alarms may be notified of the change.

In another example, individual drink and food containers that regulate the temperature of their contents need to have a constant power source. If these containers are highly mobile, it becomes difficult to maintain the power source availability. Wireless power can be used to maintain a power source availability and hence the temperature of the containers can be maintained at the desired temperature. The containers can also use the available power to report the content's temperature, level of fluid or weight of contents. An example of this is when cold/hot drinks are served on hot days, or when drinking them cold/hot is the best way to drink them, with this capability, the drinker does not have to finish their drink before it reaches the ambient temperature, but could enjoy their drinks on a longer time period. Also, when the drinks are getting low, a host can be wirelessly notified through a signal receiver and can top up the drinks in time before they run out.

In another example, when you can monitor the power usage of the devices using power receivers, it is possible to detect failed devices prior to failure. For example fire alarms may be considered as having failed if they are not consuming the nominal power they use, or when power consumption of a device changes drastically, which usually occurs when a device is about to fail.

It is to be understood that the present invention is not limited to the embodiments described above, but encompasses any and all embodiments within the scope of the following claims. For example, although a frequency of 5.8 GHz has been described above, any frequency over 100 MHz may be utilized for the power transmission frequency.

It should also be noted that any type of rechargeable batteries may be utilized to receive the charge from the power transmission grid, including standard size rechargeable batteries or custom rechargeable batteries for use in specific electronic devices, (i.e., cell phones, PDAs, and the like). These rechargeable batteries may be utilized to replace the currently existing batteries and may include the electronics of the receiver that will allow them to receive the power transmission signal and convert it to recharge the batteries.

What is claimed is:

1. A wireless power transmitter comprising:
   a controller; and
   a phased array antenna communicatively coupled to the controller, the phased array antenna having a plurality of electro-magnetic array transceivers for transmitting an electro-magnetic power transmission signal;
   wherein the controller:
   detects a presence of a plurality of mobile receivers including a first mobile receiver,
   transmits, using a first subset of the plurality of electro-magnetic array transceivers, a first electro-magnetic power transmission signal to the plurality of mobile receivers at a first frequency, wherein the first subset of the plurality of electro-magnetic array transceivers are tuned to the first frequency,
   receives, using the phased array antennae, a first indication of a power level of the first electro-magnetic power transmission signal from the first mobile receiver,
   determines a second frequency based upon the first indication of the power level,
   tunes a second subset of the plurality of electro-magnetic array transceivers to the second frequency,
   during a first period, concurrently transmits to the first mobile receiver, the first electro-magnetic power signal using the first subset at the first frequency and a second electro-magnetic power transmission signal using the second subset at the second frequency, and
   during a second period that is subsequent to the first period, stops transmitting the first electro-magnetic power transmission signal after the second electro-magnetic power transmission signal is transmitted.

2. The wireless power transmitter of claim 1, wherein the phased array antenna includes array antennae that are arranged in a non-planar form.

3. The wireless power transmitter of claim 1 wherein the controller further selects the first mobile receiver based upon a prioritization of the plurality of mobile receivers.

4. The wireless power transmitter of claim 1, wherein the first electro-magnetic power transmission signal and the second electro-magnetic power signal are microwaves.

5. A wireless power receiver comprising:
   a rectifier that concurrently receives electro-magnetic power transmission signals from a wireless power transmitter that are transmitted at a first frequency and a second frequency and feed a received electro-magnetic power transmission signals to a power meter;
   wherein the power meter measures a power signal strength indication of the received electro-magnetic power transmission signals and provide a control logic with the power signal strength indication;
   wherein the control logic receives the power signal strength indication and transmits the power signal strength indication to the wireless power transmitter; and
   wherein the wireless power transmitter:
   detects a presence of a plurality of wireless power receivers including the wireless power receiver,
   transmits a first electro-magnetic power transmission signal to the wireless power receiver at the first frequency using a first subset of a plurality of electro-magnetic array transceivers,
   receives the indication of a power level from the wireless power receiver,
   determines the second frequency based upon the indication of the power level,
   tunes a second subset of the plurality of electro-magnetic array transceivers to the second frequency,
   during a first period, concurrently transmits to the receiver, the first electro-magnetic power transmission signal using the first subset and a second electro-magnetic power transmission signal using the second subset, and during a second period subsequent to the first period, stops transmitting the first electro-magnetic power transmission signal to the receiver after the second electro-magnetic power transmission signal is transmitted.

6. The wireless power receiver of claim 5, wherein the first electro-magnetic power transmission signal and the second electro-magnetic power transmission signal are microwaves.

7. The wireless power receiver of claim 5, wherein the transmitter further determines a prioritization of the plurality of wireless power receivers.

8. The wireless power receiver of claim 5, wherein the receiver further charges an internal battery with energy from the first electro-magnetic power transmission signal and the second electro-magnetic power transmission signal.

9. The wireless power receiver of claim 5, wherein the receiver further powers internal circuitry with energy from the first electro-magnetic power transmission signal and the second electro-magnetic power transmission signal.

10. A method for receiving power and data communication wirelessly from a wireless power transmitter comprising:
    detecting, by the wireless power transmitter, a presence of a plurality of mobile receivers including a first mobile receiver;
    transmitting, by the wireless power transmitter, a first electro-magnetic power transmission signal to the plurality of mobile receivers at a first frequency using a first subset of a plurality of electro-magnetic array transceivers;
    receiving, by the wireless power transmitter, a first indication of a power level of the first electro-magnetic power transmission signal from the first mobile receiver;
    determining, by the wireless power transmitter, a second frequency based upon the first indication of the power level;
    tuning, by the wireless power transmitter, a second subset of the plurality of electro-magnetic array transceivers to the second frequency;
    during a first period, concurrently transmitting, by the wireless power transmitter, to the first mobile receiver the first electro-magnetic power transmission signal using the first subset and a second electro-magnetic power transmission signal using the second subset;
    receiving, by the wireless power transmitter, a second indication of a power level of the first electro-magnetic power transmission signal from a second mobile receiver; and
    during a second period subsequent to the first period, stopping, by the wireless power transmitter, the transmission of the first electro-magnetic power transmission signal to the first mobile receiver after the second electro-magnetic power transmission signal is transmitted.

11. The method for receiving power and data communication wirelessly from a wireless power transmitter of claim 10, wherein the wireless power transmitter includes array antennae that are arranged in a non-planar form.

12. The method for receiving power and data communication wirelessly from a wireless power transmitter of claim 10, further comprising:
    selecting, by the wireless power transmitter, the first mobile receiver based upon a prioritization of the plurality of mobile receivers.

13. The method for receiving power and data communication wirelessly from a wireless power transmitter of claim 10, wherein the first electro-magnetic power transmission signal and the second electro-magnetic power transmission signal are microwaves.

14. The method for receiving power and data communication wirelessly from a wireless power transmitter of claim 10, further comprising:
    charging, by the first mobile receiver, an internal battery of the first mobile receiver with energy from the first electro-magnetic power transmission signal and the second electro-magnetic power transmission signal.

15. The method for receiving power and data communication wirelessly from a wireless power transmitter of claim 10, further comprising:
    powering, by the first mobile receiver, internal circuitry of the first mobile receiver with energy from the first electro-magnetic power transmission signal and the second electro-magnetic power transmission signal.

16. The wireless power transmitter of claim 1, wherein the plurality of receivers includes a second mobile receiver;
    wherein the controller further:
    receives, using the phased array antennae, a second indication of a power level of the first electro-magnetic power transmission signal from the second mobile receiver,
    determines a third frequency based upon the second indication of the power level,
    tunes a third subset of the plurality of electro-magnetic array transceivers to the third frequency,
    during a third period, concurrently transmits to the second mobile receiver, the first electro-magnetic power signal using the first subset and a third electro-magnetic power transmission signal using the third subset, and
    during a fourth period subsequent to the third period, stops transmitting the first electro-magnetic power transmission signal after the second electro-magnetic power transmission signal and the third electro-magnetic transmission signal are transmitted.

17. The wireless power receiver of claim 5, wherein the plurality of wireless power receivers includes a second mobile power receiver;
    wherein the wireless power transmitter further:
    receives a second indication of a power level of the first electro-magnetic power transmission signal from the second mobile power receiver,
    determines a third frequency based upon the second indication of the power level,
    tunes a third subset of the plurality of electro-magnetic array transceivers to the third frequency,
    during a third period, concurrently transmits to the second mobile power receiver, the first electro-magnetic power signal using the first subset and a third electro-magnetic power transmission signal using the third subset, and
    during a fourth period subsequent to the third period, stops transmitting the first electro-magnetic power transmission signal after the second electro-magnetic power transmission signal and the third electro-magnetic transmission signal are transmitted.

18. The method for receiving power and data communication wirelessly from a wireless power transmitter of claim 10, wherein the plurality of mobile receivers further includes a second mobile receiver;
    wherein the method further comprises:

receiving, by the wireless power transmitter, a second indication of a power level of the first electro-magnetic power transmission signal from the second mobile receiver, determining a third frequency based upon the second indication of the power level, tuning, by the wireless power transmitter, a third subset of the plurality of electro-magnetic array transceivers to the third frequency, during a third period, concurrently transmitting, by the wireless power transmitter, to the second mobile receiver, the first electro-magnetic power signal using the first subset and a third electro-magnetic power transmission signal using the third subset, and during a fourth period subsequent to the third period, stopping, by the wireless power transmitter, the transmission of the first electro-magnetic power transmission signal to the second mobile receiver after the second electro-magnetic power transmission signal and the third electro-magnetic transmission signal are transmitted.

* * * * *